United States Patent [19]

Bozinovic et al.

[11] Patent Number: 5,621,817
[45] Date of Patent: Apr. 15, 1997

[54] POINTER-BASED COMPUTER SYSTEM CAPABLE OF ALIGNING GEOMETRIC FIGURES

[75] Inventors: Radmilo Bozinovic, San Jose; Giulia Pagallo, Cupertino, both of Calif.

[73] Assignee: Apple Computer, Inc., Cupertino, Calif.

[21] Appl. No.: 422,130

[22] Filed: Apr. 13, 1995

Related U.S. Application Data

[63] Continuation of Ser. No. 180,559, Jan. 12, 1994, Pat. No. 5,452,371, which is a continuation-in-part of Ser. No. 1,122, Jan. 5, 1993, abandoned, which is a continuation-in-part of Ser. No. 889,216, May 27, 1992, abandoned, and Ser. No. 1,123, Jan. 5, 1993, abandoned.

[51] Int. Cl.$^6$ ........................................................ G06K 9/00
[52] U.S. Cl. ............................................. 382/189; 382/294
[58] Field of Search ................................. 382/173, 187, 382/197, 199, 201, 202, 203, 224, 189, 175, 181, 186, 188, 190, 192, 195, 204, 205, 217, 282, 284, 286, 287, 288, 289, 290, 291, 292, 293, 294, 295, 296, 308, 309; 345/133, 179, 173, 156

[56] References Cited

U.S. PATENT DOCUMENTS

| | | | |
|---|---|---|---|
| 4,607,386 | 8/1986 | Morita et al. | 382/13 |
| 4,641,354 | 2/1987 | Fukunaga et al. | 382/13 |
| 4,653,107 | 3/1987 | Shojima et al. | 382/13 |
| 4,680,804 | 7/1987 | Kuzunuki et al. | 382/13 |
| 4,712,248 | 12/1987 | Hongo | 382/22 |
| 4,718,103 | 1/1988 | Shojima et al. | 382/13 |
| 4,757,549 | 7/1988 | Machart et al. | 382/3 |
| 4,876,728 | 10/1989 | Roth | 382/21 |
| 4,878,249 | 10/1989 | Mifune et al. | 382/13 |
| 4,933,865 | 6/1990 | Yamamoto et al. | 364/518 |
| 4,969,201 | 11/1990 | Takasaki et al. | 382/22 |
| 5,012,521 | 4/1991 | Endo et al. | 382/189 |
| 5,038,382 | 8/1991 | Lipscomb | 382/13 |
| 5,058,180 | 10/1991 | Khan | 382/14 |
| 5,065,439 | 11/1991 | Takasaki et al. | 382/25 |
| 5,077,807 | 12/1991 | Bokser | 382/14 |
| 5,121,442 | 6/1992 | Togawa et al. | 382/13 |
| 5,195,147 | 3/1993 | Ohta | 382/21 |

OTHER PUBLICATIONS

O'Connor, Rory J., "Apple banking on Newton's brain", San Jose Mercury News, Apr. 22, 1992, discusses planned features and uses of a new pen–based computer system. (No Page Number).

Weiman, Liza and Moran, Tom, "A Step toward the Future", Macworld, Aug. 1992, pp. 129–131, provides information on the hardware design features, uses and planned innovations of a pen–based, hand–held computer.

Soviero, Marcelle, M., "Your World According to Newton", Popular Science, Sep. 1992, pp. 45–49, describes the design characteristics, potential applications, and possible future embodiments of a pen–based computer.

Abatemarco, Fred, "From the Editor", Popular Science, Sep. 1992, p. 4, comments on the impact of new technology as provided by a pen–based computer that functions as a personal digital information assistant.

Wiley & Sons, 1973, pp. 210–217, 338–339,discusses various approaches for data decription including a clustering approach. (No Title, No Arthur).

Paulidis, T; and Van Wyk, C.J., "An Automatic Beautifier for Drawings and Illustrations", Siggraph vol. 19, pp. 225–234, San Francisco, Jul. 22–26, 1985.

Primary Examiner—Leo Boudreau
Assistant Examiner—Bijan Tadayon
Attorney, Agent, or Firm—Hickman Beyer & Weaver

[57] ABSTRACT

An apparatus for recognizing shapes characterized by a stroke grouper receptive to a plurality of strokes formed on a screen of a pen-based computer system; a shape recognition engine receptive to a stroke group produced by the stroke grouper; and a knowledge base coupled to the shape recognition engine, where the knowledge base includes, at a minimum, knowledge concerning closed polygons and closed curves. Preferably, the closed curves of the knowledge base include both circles and ellipses. A method for recognizing digitized shapes in a computer system includes the steps of receiving at least one user-initiated stroke; grouping the user-initiated stroke with related strokes to form a stroke group; and analyzing the stroke group to make a best-guess shape represented by the stroke group. Preferably, the method also looks for other shapes which are related to the best-guess shape and modifying at least one of the location, size, or shape of the best-guess shape to conform with the other shapes. The strokes are typically grouped when they are related in time, or space, or in both time and space. A method for recognizing and forming shapes includes the steps of: creating a live group including at least one live stroke; characterizing shape sides from the live group, where a shape side is either straight or curved; forming a polygon from the shape sides if all the shape sides are straight; forming an ellipse from the shape sides if all the shape sides are curved; and forming a composite curve from the shape sides if the shape sides are a mixture of straight sides and curved sides. The step of characterizing shape sides preferably includes the steps of: finding kinks in the live group; defining shape sides as segments between the kinks; and determining whether the shape sides are straight or curved.

13 Claims, 32 Drawing Sheets

| STROKE # | ORDER # | SENSE |
|---|---|---|
| 0 | 3 | |
| 1 | 4 | |
| 2 | 2 | |
| 3 | 5 | |
| 4 | 1 | |

N STROKES ↓

← 134

LIVE GROUP

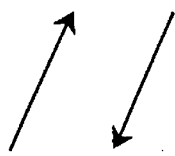
$dx_1 = -dx_2$
$dy_1 = -dy_2$
*Figure 15a*
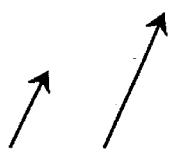
$dx_1 = kdx_2$
$dy_1 = kdy_2$
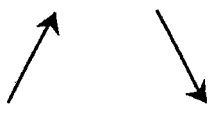
$dx_1 = dx_2$
$dy_1 = -dy_2$
*Figure 15b*
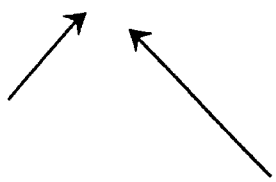
$dx_1 = -kdx_2$
$dy_1 = kdy_2$
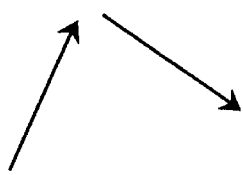
$dx_1 = -dy_2$
$dy_1 = dx_2$
*Figure 15c*
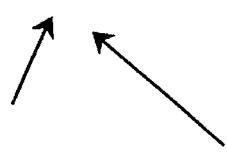
$dx_1 = kdx_2$
$dy_1 = -kdy_2$

POINTER-BASED COMPUTER SYSTEM CAPABLE OF ALIGNING GEOMETRIC FIGURES

CROSS-REFERENCE TO RELATED APPLICATIONS

This is a continuation of application Ser. No. 08/180,559 filed on Jan. 12, 1994, now U.S. Pat. No. 5,452,371, which is a continuation-in-part of U.S. patent application Ser. No. 08/001,122, filed Jan. 5, 1993, now abandoned naming Bozinovic et al. as inventors, and assigned to Apple Computer, Inc. That application is, in turn, a continuation-in-part of the following co-pending U.S. patent applications:

1. "Recognition Architecture and Interface", of Beerink et al., U.S. Ser. No. 07/889,216, filed May 27, 1992, now abandoned, and assigned to Apple Computer, Inc.;
2. "Method and Apparatus for Computerized Recognition", of Pagallo et al., U.S. Ser. No. 08/001,123, now abandoned, filed Jan. 5, 1993, and assigned to Apple Computer, Inc.

The disclosures of each of the parent and grandparent applications are hereby incorporated herein by reference for all purposes and in their entireties.

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based computer system. A pen-based computer system is typically a small, hand-held computer where the primary method for inputting data includes a "pen" or stylus. A pen-based computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus across the surface of the screen. A stroke is defined as the engagement of the screen with a stylus, the movement of the stylus across the screen (if any), and its subsequent disengagement from the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Besides serving as a notepad, pen-based computers can provide a number of useful functions, such as serving as an address book, an appointment calendar, a to-do list, etc.

Ink on the screen of a pen-based computer system is typically stored as a simple bit-map. Essentially, the only knowledge that the computer system has of the inked image is that certain pixels of the display are activated to create the inked image. Therefore, a hand-drawn shape, such as a square or circle, has no meaning to the system other than certain pixels of the screen are to be turned on or off to create an inked image of the words.

It would be desirable to be able to recognize a hand-drawn shape as falling within a generic class such as squares, circles, etc. In this way, additional meaning can be attached to the hand-drawn shapes, allowing the computer to manipulate the shapes in a more intelligent fashion. For example, it would be desirable for a computer to recognize a hand-drawn square or circle, and return a perfectly formed square or circle in its place.

Some specific application programs of the prior art can perform a limited shape recognition task. For example, some prior art drafting application programs can "auto-trace" a scanned-in image which can be "cleaned up" by the application program. However, the recognizing ability of such application programs is limited, and do not recognize shapes in a "real-time" manner as would be required in a pen-based computer system.

SUMMARY OF THE INVENTION

The shape recognizer of the present invention is capable of real-time recognition of hand-drawn shapes on the screen of a pen-based computer system. In addition to being able to recognize simple shapes such as triangles, squares, and circles, the recognizer of the present invention can recognize complex open and closed polygons, ellipses, composite curves, etc. The shape recognizer of the present invention also recognizes relationships between a recognized shape and surrounding shapes, and can modify a recognized shape to better fit its environment.

An apparatus for recognizing shapes in accordance with the present invention includes: a stroke grouper receptive to a plurality of strokes formed on the screen of a pen-based computer system and operative to create a stroke group; a shape recognition engine receptive to the stroke group; and a knowledge base coupled to the shape recognition engine, where the knowledge base includes knowledge concerning closed polygons and closed curves. The shape recognition engine in conjunction with the knowledge base attempts to recognize the stroke group as a geometric figure taken from the classes of closed polygons and closed curves. Preferably, the closed curves include ellipses and circles (a degenerate form of an ellipse). More complex forms of the present invention have knowledge bases which include knowledge concerning additional shapes such as open polygons, open curves, triangles, squares, rectangles, parallelograms, lines, dots, etc.

A method for recognizing digitized shapes in a computer system comprises the steps of: receiving at least one user-initiated stroke; grouping the user-initiated stroke with related strokes to form a stroke group; and analyzing the stroke group to make a best-guess shape represented by the stroke group. The method preferably further includes the steps of looking for other shapes which are related to the best-guess shape and modifying at least one of the location, size or shape of the best-guess shape to conform with the other shapes. The grouping step preferably groups strokes that are related in time, or space, or both. Preferably, the analyzing step comprises a form of rule-based analysis of the stroke group.

A method for recognizing and forming shapes in accordance with the present invention includes the steps of: creating a live group including at least one live stroke; characterizing shape sides from the live group, where a shape side is either straight or curved; forming a polygon from the shape sides if all of the shape sides are straight; forming an ellipse from a single curved side if the side meets certain criteria; and forming a composite curve from the shape sides in all other cases. Preferably, the step of characterizing shape sides comprises the steps of: finding kinks in the live group; defining shape sides as sequences of segments between the kinks; and determining whether the shape sides are straight or curved.

In another aspect, the invention provides a method for connecting an open end of an open shape to an object. The open shape will have an end segment defined between an end point (at the open end) and an end segment point. The method includes the following steps: (1) determining whether the end point lies within a predefined distance of the object, (2) if the end point does lie within the predefined distance, identifying an intersection point on the object which will define a connection point between the object and the open shape, and (3) replacing the end segment(s) with a connection segment drawn between the open shape and the intersection point. In preferred embodiments, the intersection point on the object (to which the connection segment will be drawn) is a kink, a straight side, or an open end. The method of drawing the connection segment will depend upon whether the open end is part of a curve or straight segment. If it is straight, the connecting segment is simply a straight segment drawn between the first kink on open shape (moving away from the open end) and the intersection point. If the open segment is curved, the connecting segment is a curve drawn between a key point on the open shape and the intersection point. A key point is a point on a curve that is used as a parameter to mathematically define the curve. When the intersection point is itself an open end on the object, the two open ends may be joined by a "smooth join" if the two ends approach each other at a sufficiently similar angle. The process of making a smooth join includes the following steps: (1) successively evaluating key points on the open end of the open shape starting with the first key point beyond the end point and proceeding away from the open end, for each key point so evaluated determining the tangent at that key point and creating a hypothetical line connecting that key point and the intersection point, (2) identifying the first key point so evaluated that has a tangent pointing to a side of the hypothetical line that is opposite the side to which the tangent at the intersection point points, and (3) creating a curve between the first key point determined in step 2 and the intersection point.

In yet another aspect, the present invention provides a method of arranging shapes on a display screen such that some shapes added to the display screen are aligned with respect to existing shapes already present on the display screen. Each shape will have an alignment parameter such as the x and y coordinates of its center and a size (e.g., a radius for a circle). In preferred embodiments, this method is applied to circles and squares, each of which have alignment parameters that include a center position and a characteristic size only. The existing shapes will be grouped into one or more clusters, each of which will possess certain statistical characteristics. The method includes the following steps: (1) determining the value of a specified alignment parameter for each shape added to the display screen, (2) defining for each cluster a fixed value for the alignment parameter, a mean value of the alignment parameter, and a variance from the mean for the shapes making up the cluster, (3) determining whether the value of a new shape's alignment parameter is within a defined threshold distance of any cluster's center, (4) if the new shape's alignment parameter is within said defined threshold distance of a close cluster's center, adding the new shape to that cluster such that the new shape is aligned with the fixed value of the close cluster, and (5) redefining the mean value of the alignment parameter and the variance from the mean for the shapes making up the close cluster to account for the addition of the new shape to the close cluster. Preferably, the fixed value for the alignment parameter is set equal to alignment parameter of the first shape added to the cluster. Also, in the step of aligning the new shape with the fixed value of the close cluster, the new shape is displayed as if the value of its alignment parameter was equal to the fixed value for the close cluster.

These and other features and advantages of the present invention will become apparent upon a reading of the following descriptions and a study of the various figures of the drawing.

BRIEF DESCRIPTION OF THE DRAWINGS

FIG. 15A illustrates the "generate equations relating sides" step of FIG. 14;

FIG. 15B illustrates the "generate equations related to rotated angle clusters" step of FIG. 14;

FIG. 15C illustrates the "generate equations related to reflected angle clusters" step of FIG. 14;

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
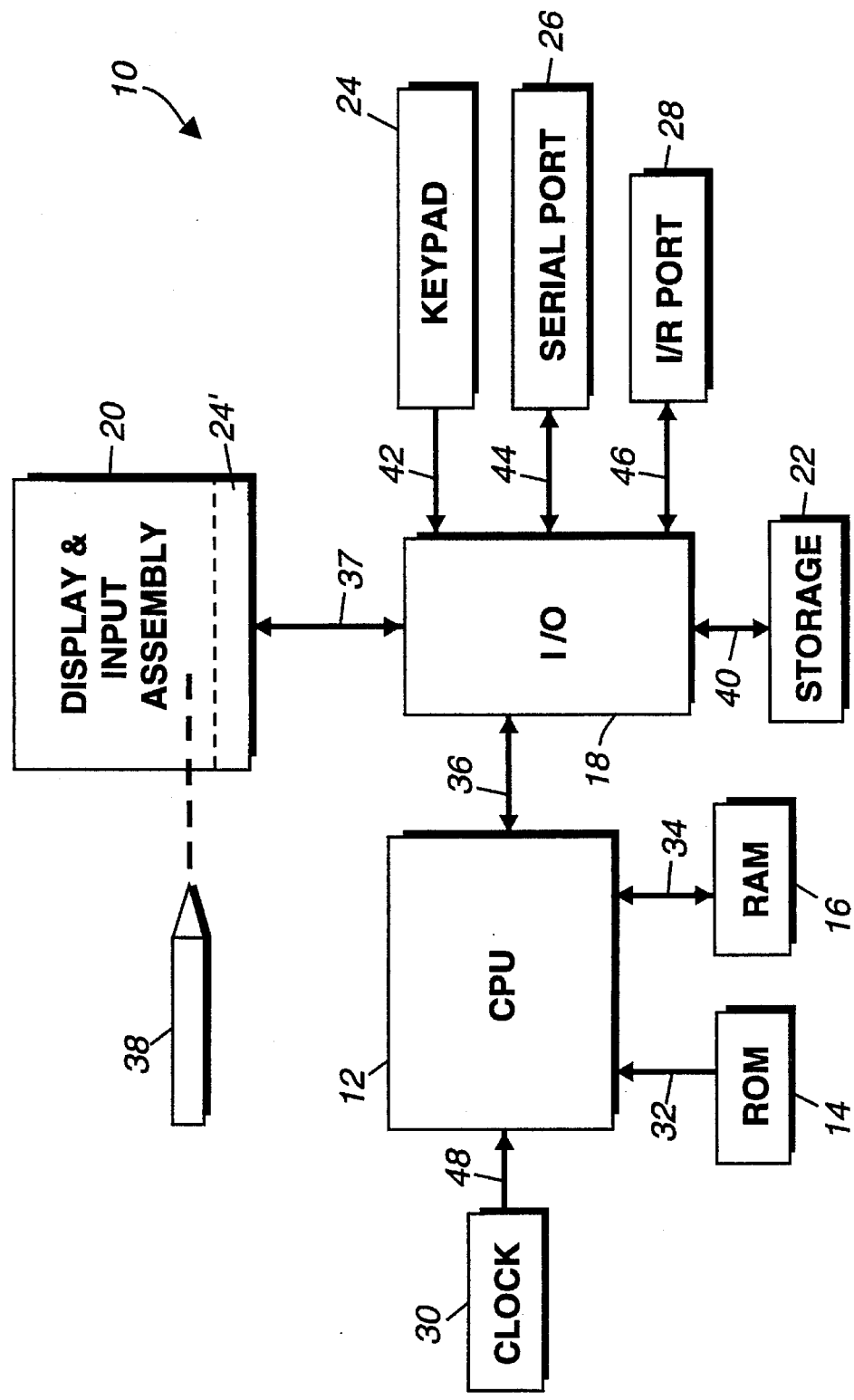
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a hi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also commercially available. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
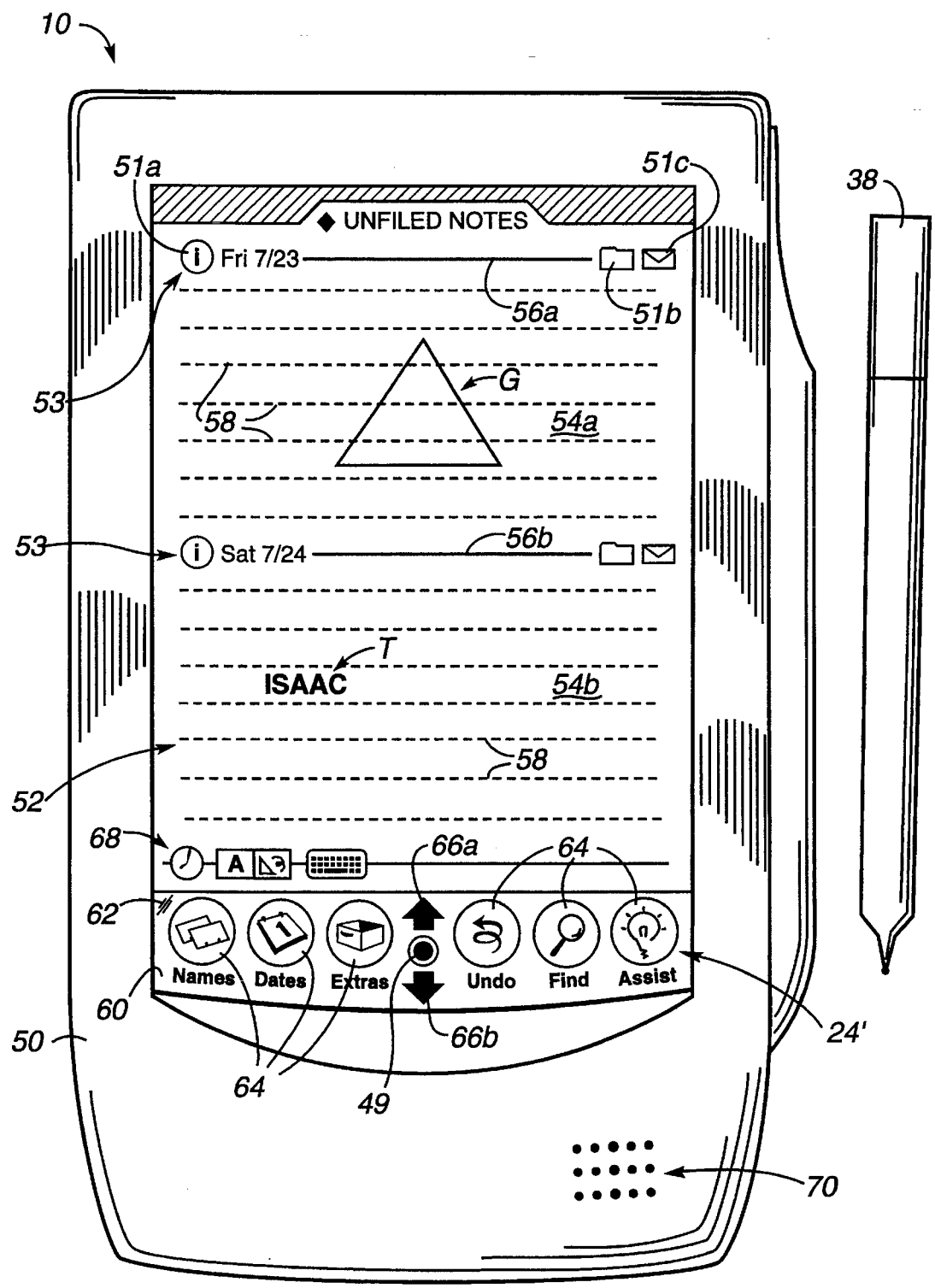
FIG. 2 is a top plan view of the screen, case, and keypad of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (L/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 30 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header 53 and a number of guidelines 58. The header 53 preferably includes a header bar 56a, the date of creation of the note area 54a, and one or more icons and "soft" dedicated header function buttons 51A, 51B, and 51C. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64, an "overview button" 49, and a pair of scroll buttons 66a and 66b. The operation of the note areas 54a, 54b, etc., scroll buttons 66a and 66b, and other aspects of computer system 10 are discussed in greater detail below.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al. entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Smucker, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Levesque, Morgan Kaufman, San Mateo, 1985.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

Figure 3:
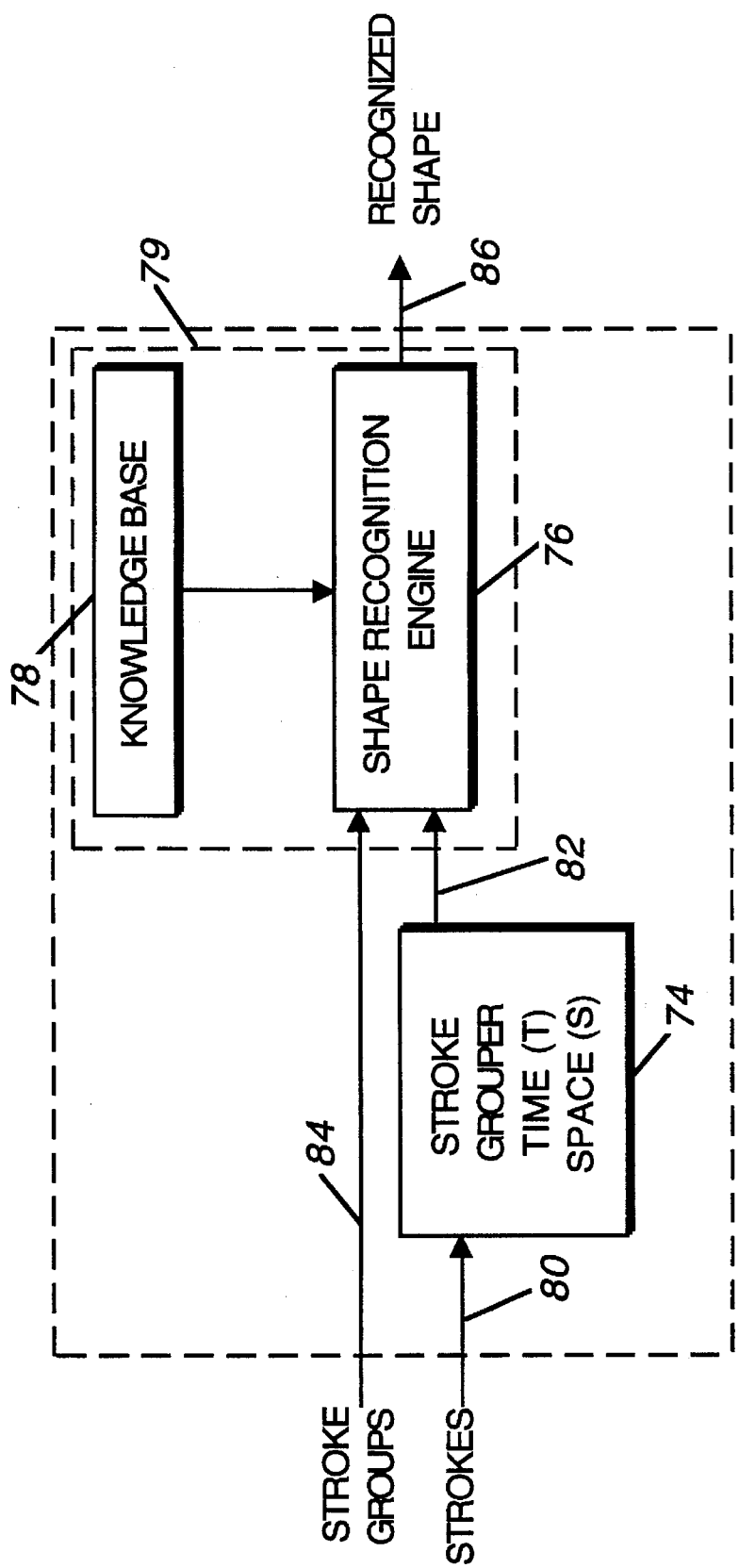
FIG. 3 is a block diagram of an apparatus for recognizing shapes in accordance with the present invention.

FIG. 3 illustrates an apparatus 72 in accordance with the present invention for recognizing shapes. The apparatus 72 includes a stroke grouper 74, a shape recognition engine 76, and a knowledge base 78. The engine 76 and knowledge base 78 often form a single integrated unit 79, but can be thought of as separate functional items. The apparatus 72 is preferably implemented as a computer implemented process on the hardware shown and described in FIG. 1. Alternatively, the apparatus 72 can be implemented in hardware, as is well known to those skilled in the art.

The stroke grouper 74 is receptive to strokes 80 formed on the screen of a pen-based computer system such as computer system 10, or to stroke units generated by any other means. For example, strokes 80 could be generated on a pressure-sensitive tablet attached to a conventional computer system. The stroke grouper 74 is operative to produce a stroke group 82 which is input into the shape recognition engine 76. The shape recognition engine 76 can also receive stroke groups 84 from other sources, such as through an I/O port, etc.

Stroke grouper 74 groups strokes according to time (T) and space (S). If strokes 80 are close both in time and space, they form part of a "live set" and are considered a part of the stroke group. As used herein, "stroke group" comprises a data structure which characterizes one or more user-initiated strokes.

The shape recognition engine 76 uses the knowledge in the knowledge base 78 to propose a best-guess recognized shape 86. The knowledge base 78 of the present invention emphasizes rules for recognizing closed polygons and closed curves. The closed polygons can have three or more sides, and the closed curves preferably comprise circles and ellipses. The knowledge base 78 also includes rules concerning specific polygons, such as triangles, squares, rectangles, parallelograms, etc., rules concerning open polygons and open curves, rules concerning lines, and rules concerning dots.

Figure 4:
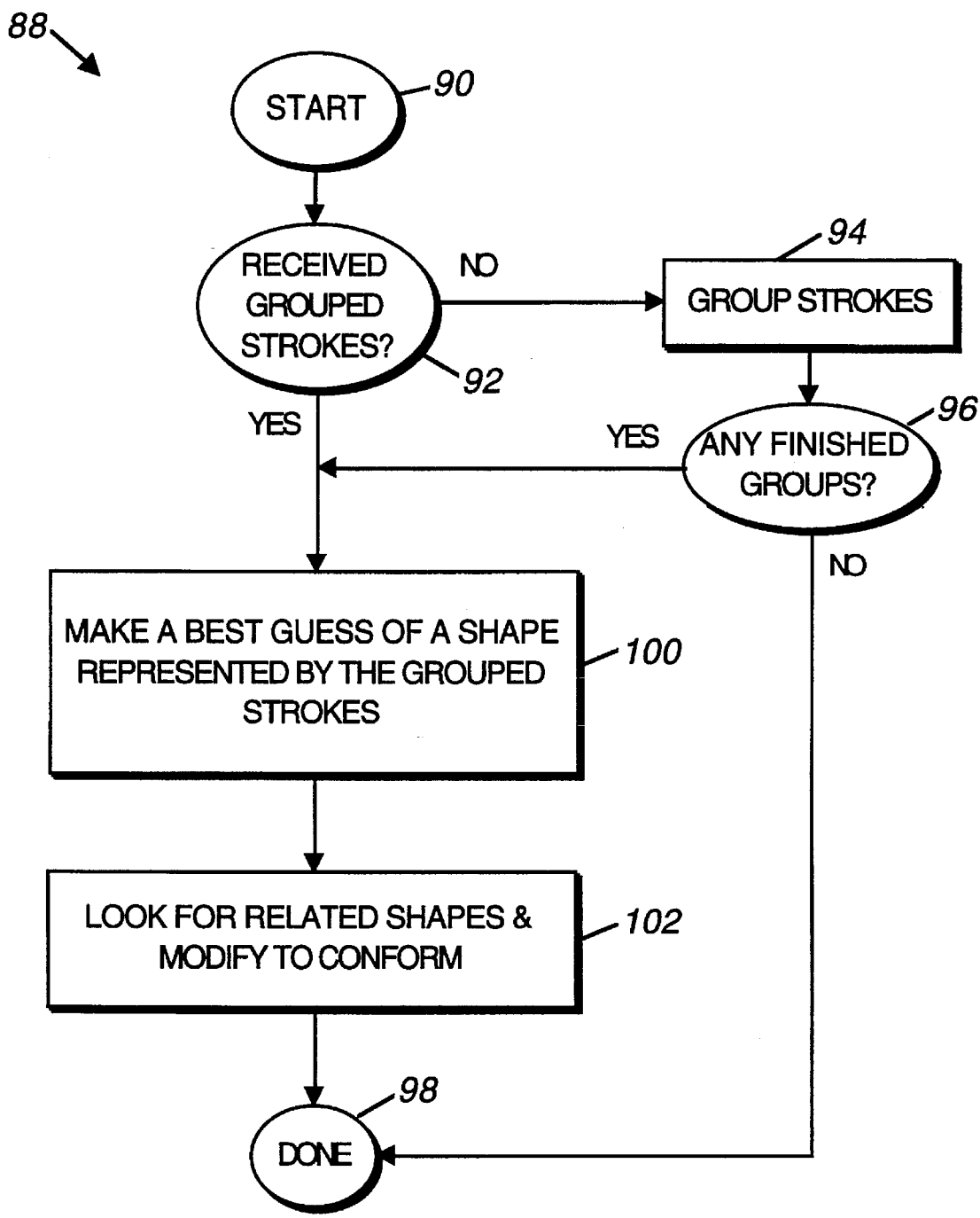
FIG. 4 is a flow diagram of a method for recognizing digitized shapes in a computer system in accordance with the present invention.

FIG. 4 illustrates a computer implemented process 88 for recognizing digitized shapes in a computer system. The process 88 starts at 90 with a new stroke of timeout, and then a step 92 determines whether grouped strokes have been received. If not, a step 94 groups the strokes, and a step 96 determines whether there are any finished groups to pass. If there are not any finished groups, the process 88 is completed as indicated at 98. If there are any finished groups, a step 100 makes a best guess of a shape represented by the stroke group and passes the appropriate parameters in a step 100. Next, in a step 102, the system 10 looks for related shapes to the best-guess shape and modifies the best-guess shape to conform to the related shapes. The process 88 is then completed as indicated at 98.

Figure 5:
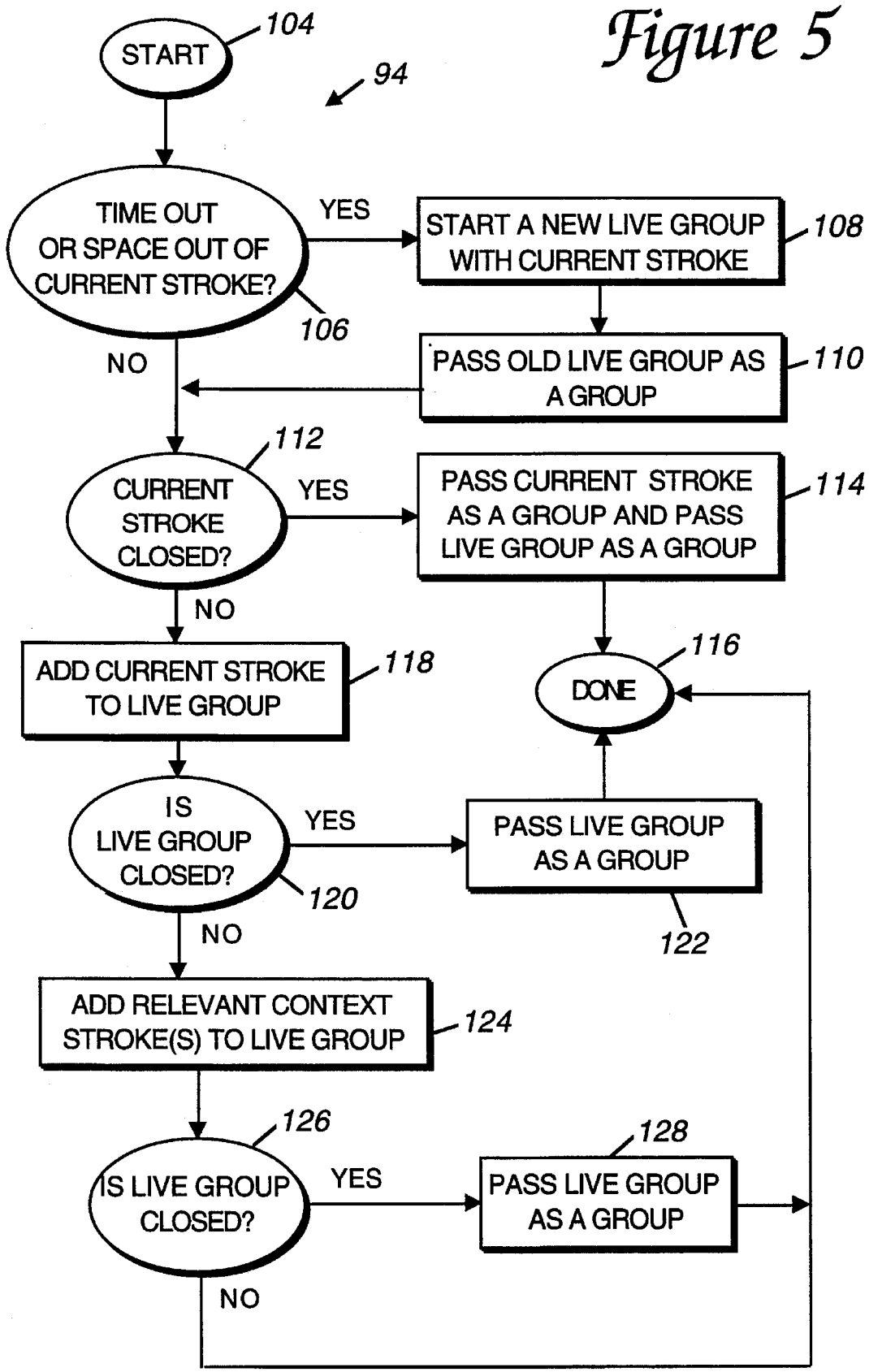
FIG. 5 is a flow diagram of the "group strokes" step of FIG. 4.

FIG. 5 illustrates the step 94 of FIG. 4 in greater detail. The process 94 begins at 104 with a new stroke or a timeout, and it is determined in a step 106 whether there has been a timeout or spaceout of the current stroke in a step 106. A timeout occurs when there is a longer than Δt interval between strokes, and a spaceout occurs when there is a larger than Δd distance between a stroke and a live group of strokes. If there has been a timeout or spaceout, a new live group is started in a step 108, and the old live group is passed as a group in a step 110 before process control returns to step 112. If step 106 determines that there is not a timeout or a spaceout, step 112 determines whether the current stroke is closed. If the current stroke is closed, a step 114 passes the current (incoming) stroke as a group and passes the live group as another group and the process is completed as indicated at 116. If the current stroke is not closed as determined by step 112, the current stroke is added to the live group in a step 118. The mechanistic details of this process are described below in connection with the process of adding relevant context stroke(s) to a live group (FIGS. 8B–8D). A step 120 then determines whether the live group is closed and, if it is, a step 122 passes the live group, after which time the process 94 is completed as indicated at 116. If step 120 determines that the live group is not closed, relevant context strokes are added to the live group in a step 124. Step 126 then determines whether the live group is closed and, if it is, the live group is passed in a step 128 and the process is completed at step 116. Alternatively, if the live group is not closed as determined by step 126 and the process 94 is completed at step 116.

Figures 6A, 6B:
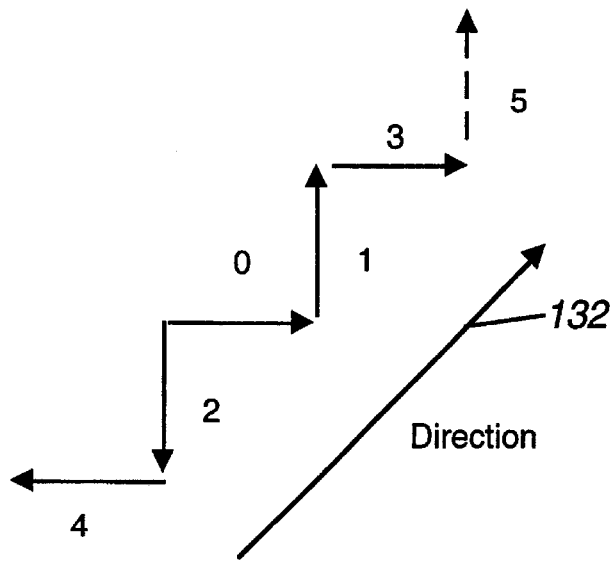
FIGS. 6A and 6B are used to further illustrate the "strokes" step of FIG. 4.

FIGS. 6A and 6B help illustrate the concept of a live group and how a stroke can be added to the live group as in step 118 of FIG. 5. With reference to FIG. 6A, five strokes have been made on the screen in the order 0, 1, 2, 3, and 4. The direction of each individual stroke is indicated by the arrow. The overall direction of the combined strokes is indicated by the arrow 132. A sixth stroke (labeled "5") is shown in broken lines to illustrate how a stroke is added to a live group of strokes. As used herein, the term "live group" refers to a related group of strokes that is open to additions at that particular point in time.

In FIG. 6B, a table is used to further illustrate the concept of a "live group." A live group 134 includes a number of individual strokes NSTROKES. The strokes may be stored in chronological order staging with stroke number 0 and ending with stroke number NSTROKES–1. This stroke number is shown in the first column of Table 133. The second column of Table 133 indicates the order number within the live group taken as a whole. Referring briefly to FIG. 6A, if the direction to be taken as indicated in 132, the live group begins with stroke number 4 (order #1), and continues with strokes 2, 0, 1, and 3. The last column in Table 133 is the "sense" of the stroke. Again, the sense is taken with reference to the overall direction 132 (see FIG. 6A) where the sense is "0" if it is in the direction 132, and is "1" if the direction is not in the direction 132. Therefore, strokes 2 and 4 have a "1" sense, and strokes 0, 1, and 3 have "0" senses.

Figure 7:
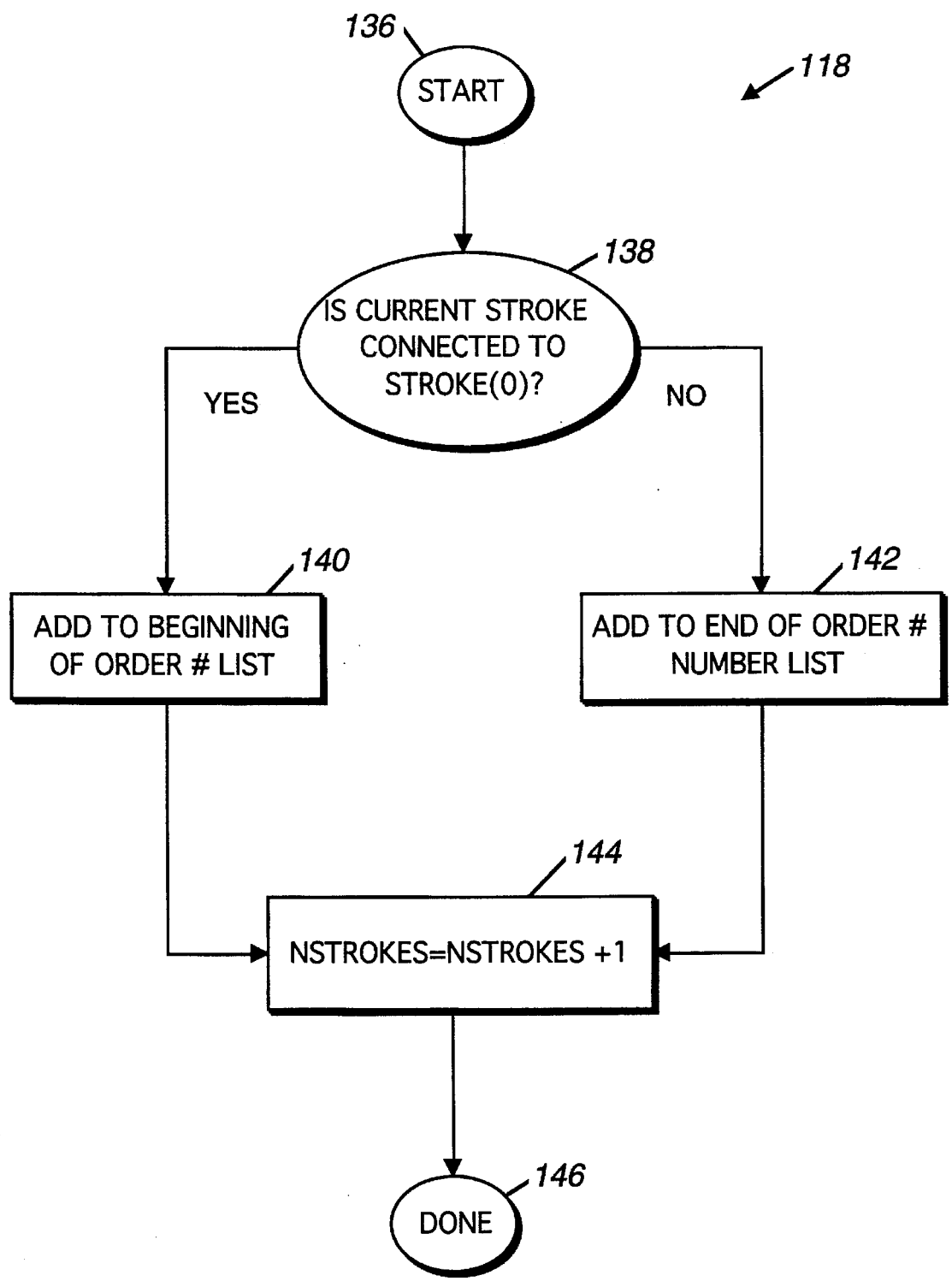
FIG. 7 is a flow diagram illustrating the "add current stroke to live group" step of FIG. 5.

FIG. 7 further illustrates the step 118 "add current stroke to live group" of FIG. 5. The process 118 begins at 136 and, in a step 138, it is determined whether the current or incoming stroke is "connected" to the first stroke in the live group, i.e. STROKE(0), which in this case was stroke number 4 (order number 1). If it is, this current or incoming stroke is added to the beginning of the order number list in a step 140. If step 138 determines it is not connected to the first order number, it must be connected to the last order and, therefore, it is added to the end of the order number list in a step 142. The number of strokes NSTROKES in the live group is iterated by one in a step 144, and the process is completed at 146.

Figure 8A:
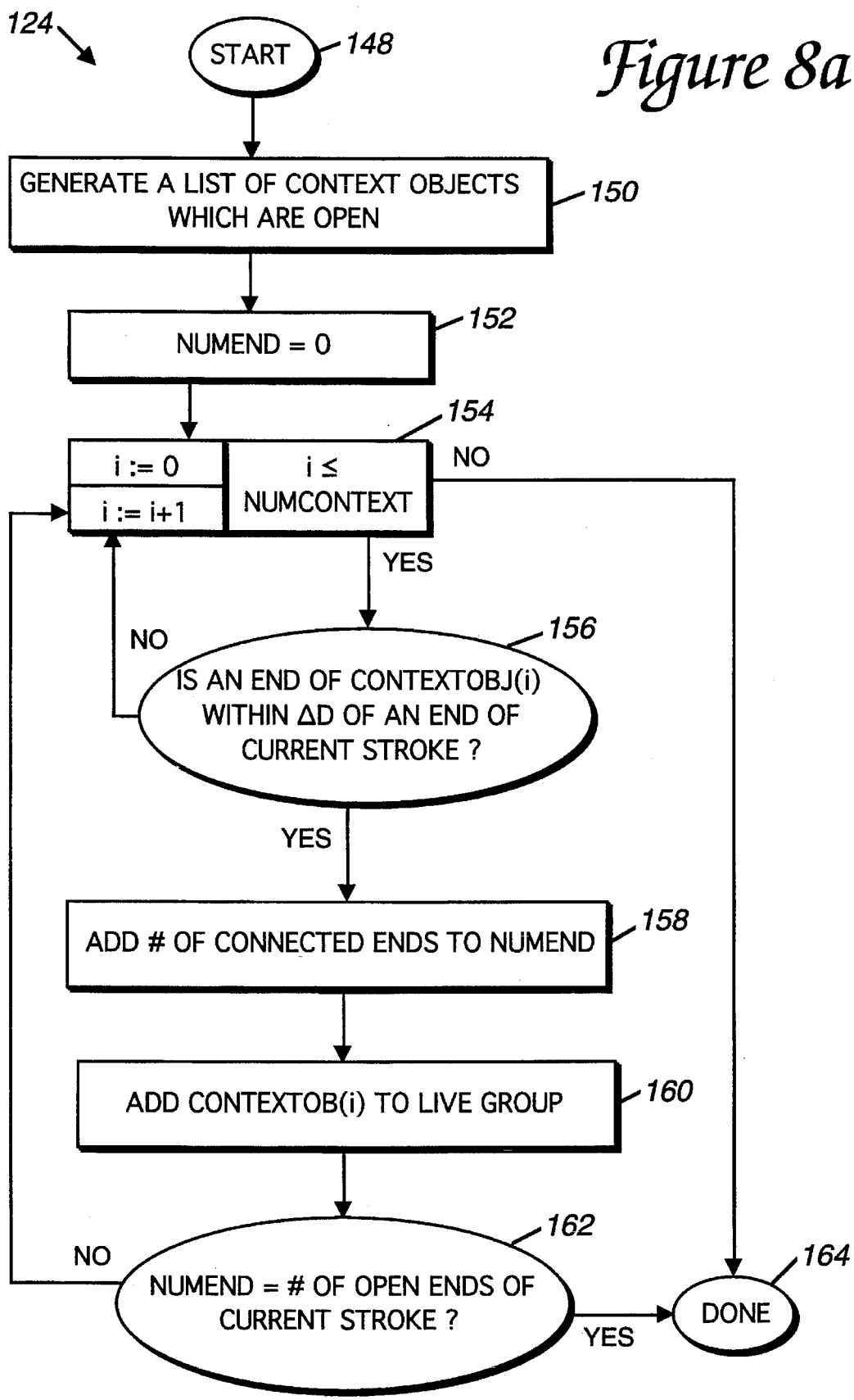
FIG. 8A is a flow diagram illustrating the "add relevant context strokes to live group" step of FIG. 5.
Figure 8B:
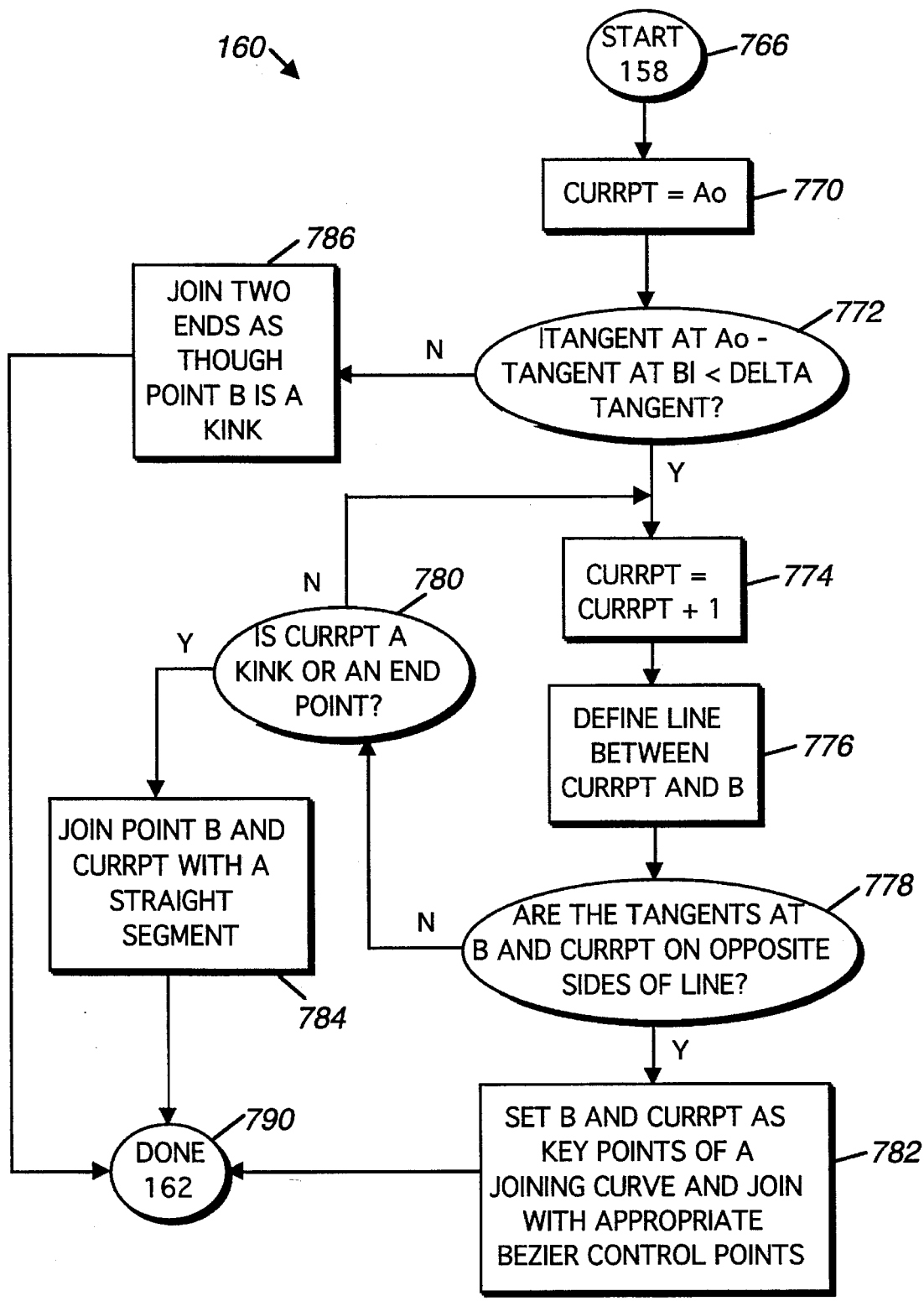
FIG. 8B is a flow diagram illustrating "add contextob(i) to live group" step of FIG. 8A.
Figure 8C:
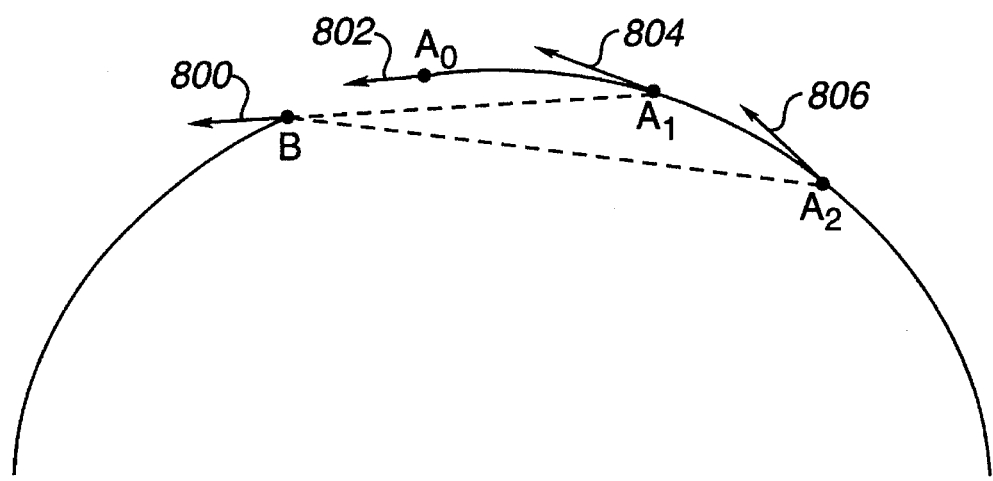
FIGS. 8C and 8D are graphical representations of the process employed to close a gap between two end points.
Figure 8D:
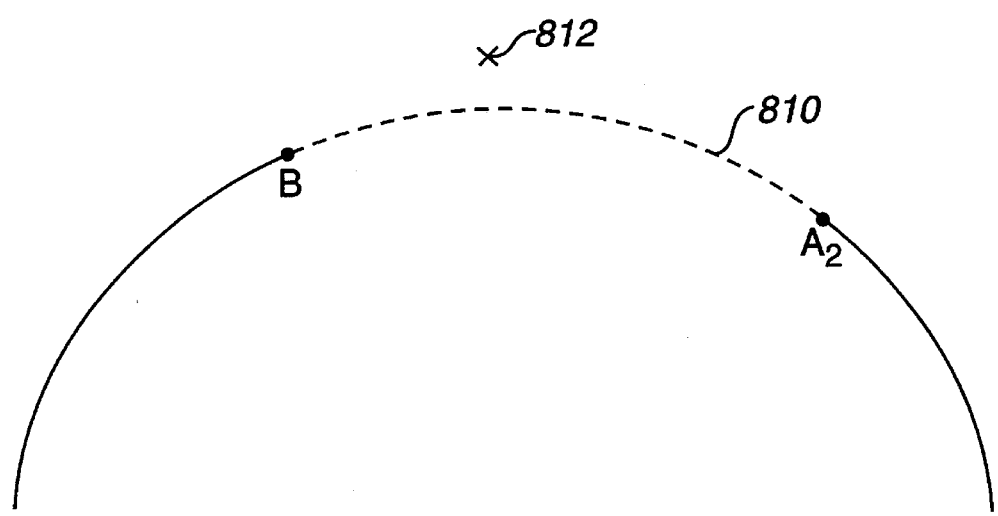

FIG. 8A illustrates the step 124 "add relevant context strokes to live group" of FIG. 5. The process 124 starts at 148, and a list of context objects which are open are generated in a step 150 and NUMCONTEXT is defined. Next, in a step 152, the variable "NUMEND" is set to zero. An iterative step 154 sets a counter i to zero and compares it with the constant NUMCONTEXT which was determined in step 50. If the variable i is less than NUMCONTEXT, a decision step 156 determines whether there is an end of the $i^{th}$ context object CONTEXTOBJ(i) within ΔD of an end of the live group. If not, process control is returned to iterative step 154 and the counter i is incremented. If an end of CONTEXTOBJ(i) is within ΔD of an end of the current stroke as determined by step 156, a step 158 adds the number of connected ends to the variable NUMEND. Next, in a step 160, CONTEXTOBJ(i) is added to the live group. The step 160 is very similar to the step 118 of FIG. 5, which is illustrated in FIG. 7. Next, in a step 162, it is determined whether the number of ends NUMEND is equal to the number of open ends in the current stroke. If not, process control is returned to iterative step 154 and the variable i is incremented. If NUMEND equals two in step 162 then the process is completed as indicated in step 164. The process also completes when the iterative step 154 determines that the counter i is greater than or equal to the constant NUM-CONTEXT.

The mechanics of step 160 (adding a context object to a live group) are detailed in FIG. 8B. The same procedure is employed to add a current stroke to a live group (step 118 of FIG. 5). In this process, the system attempts to connect open ends smoothly. It should be noted that the same process can be employed to close a current stroke or live group. In any case, the process will be described with reference to the graphical objects shown in FIGS. 8C and 8D. Initially, the two open ends to be joined include a first end B and second end Ao as shown in FIG. 8C. Disposed at varying distances along the second curve are (key points) shown as A1 and A2. As described below, key points are parameters on a curve which together with "control points" mathematically define the shape of a Bezier, spline or other curve representation. Key points may also represent an interface between two sides of a graphical object (i.e. "kinks").

The process begins at 766 and then a variable CURRPT is set equal to the end point Ao in a step 770. As will be apparent in the discussion below, CURRPT may change during the course of the process; it can change from one key point to the next along the curve. After step 770, a decision step 772 determines whether the values of the tangent angles at ends Ao and B are separated by no more than a value "Δtan." This step is employed to determine whether the slopes of the curves at the two end points are sufficiently close that they can be connected by a "smooth join." If the answer to decision step 772 is yes, the system assumes that a smooth join is possible and a process step 774 sets CURRPT equal to CURRPT+1. Referring to FIG. 8C this means that the CURRPT has moved from Ao to A1. Next, a step 776 defines a line segment between CURRPT and end point B. The tangent at CURRPT (e.g. tangent 804 at point A1) is the compared with tangent 800 at end point B and the line segment between point B and point A1 in a decision step 778. The comparison is made by determining whether tangent 800 and 804 lie on opposite sides of the line segment connecting end point B with point A1. As can be seen from FIG. 8C, this is not the case. Thus, under these circumstances the answer to decision step 778 is no. Next a decision step 780 determines whether CURRPT is a kink or the opposite end of a segment. If not, as is the case in FIG. 8C, process control returns to step 774 where CURRPT is again set equal to CURRPT+1. In the case of FIG. 8C, CURRPT is now point A2 on the curve. Thereafter in step 776 a line segment is drawn between end point B and CURRPT A2. Comparing the tangents 806 (at CURRPT A2) with 800 (at end point B), it is seen that the tangent lie on opposite sides of the line segment B–A2. Thus, at this point decision step 778 is answered in the affirmative. Thereafter, a step 782 joins end point B with CURRPT A2 using appropriate Bezier control points. As will be explained in more detail below, Bezier as well as other mathematical depictions of curved segments are defined by at least two key points and at least one control point. In this case, the key points are end point B and CURRPT (the smooth curve segment joining the two ends is not affected by the previously considered key points—in this case, Ao and A1). In other words, each time CURRPT is incremented by one, the previous key point and its associated curved segment are excised.

FIG. 8D shows a graphical representation of how the, two curved segments depicted in FIG. 8C would join according to the above process. The two key points are point B and point A2, the control point is shown as "x" 812, and the joining curve is shown as segment 810.

In the above example, it was assumed that each of the CURRPTs was a key point on a continuous curve. However, it is possible that the CURRPT could be a kink on another end point. If so, the decision step 780 is answered in the affirmative and the two open ends are connected by simply drawing a straight segment between them in step 784. Thereafter, the process is concluded at 790.

As noted, in some cases the tangent at end points B and Ao are sufficiently disparate that a "smooth join" cannot be performed. In this case, decision step 772 is answered in the negative and the two end points are joined directly in a step 786 according to a procedure described below in connection with FIG. 21A. Briefly, that process involves replacing end point Ao with end point B. If point Ao is simply part of a straight segment, the join is accomplished by creating a line segment between point A1 and point B. If, on the other hand, end point Ao is part of a curved segment, the initial curve segment define between points Ao and A1 is replaced with a new curve segment between key points B and A1.

Figure 9:
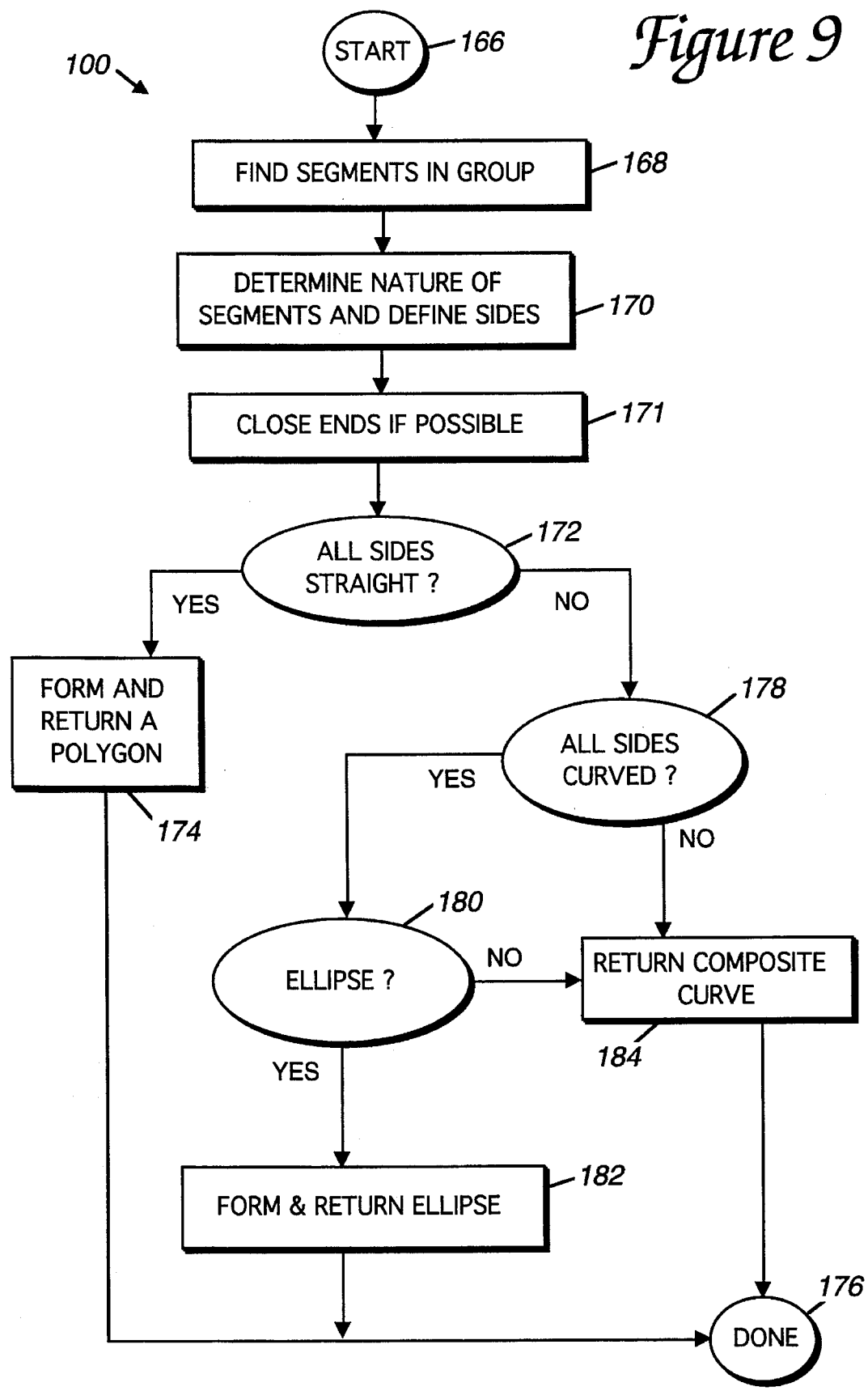
FIG. 9 is a flow diagram illustrating the "make a best guess" step of FIG. 4.

FIG. 9 illustrates step 100 of FIG. 4 in greater detail. The process starts at 166 and, in a step 168, the segments in the live group are found. Next, in a step 170, the nature of the segments in the live groups are determined, and sides are defined. In step 171, ends are closed in a smooth fashion (as opposed to chinked) if possible. In a decision step 172, it is determined whether all of the sides in the live group are straight. If so, a step 174 forms and returns a polygon, and the process is completed as indicated at 176. If step 172 determines that not all the sides are straight, a decision step 178 determines whether all the sides are curved. If all of the sides in the live group are curved, a step 180 determines whether the live group forms an ellipse. The term "ellipse" as used herein shall mean a traditional ellipse having two foci, and the degenerate form of an ellipse, a circle, where the two foci are coincident at the center of the circle. If step 180 determines that the live set forms an ellipse, an ellipse is formed and returned in a step 182 and the process is completed at 176. If step 180 determines that the live set does not form an ellipse, a composite curve is formed and returned in a step 194 and the process is, once again, completed at 176.

Figure 10:
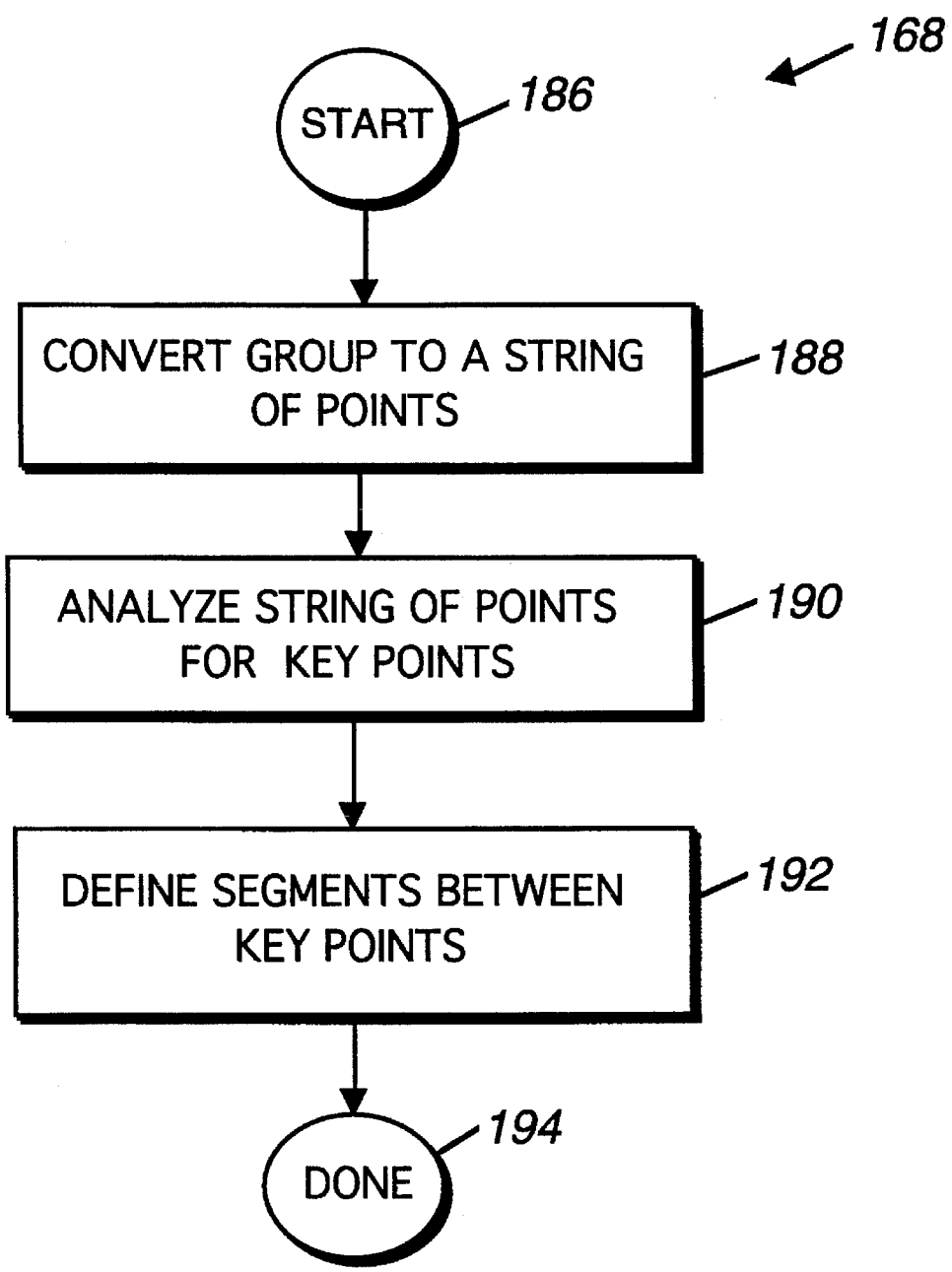
FIG. 10 is a flow diagram of the "find segment in live group" step of FIG. 9.

FIG. 10 illustrates step 168 of FIG. 9 in greater detail. The process starts at 186 and, in a step 188, the live group is converted into a string of points. Next, in a step 170, the string of points are ,analyzed for "key points", i.e. points which may be the interface between two sides of a graphical object. Finally, in a step 192, segments are defined between the key points determined by step 190. The process is then complete as indicated at 194.

Figure 11:
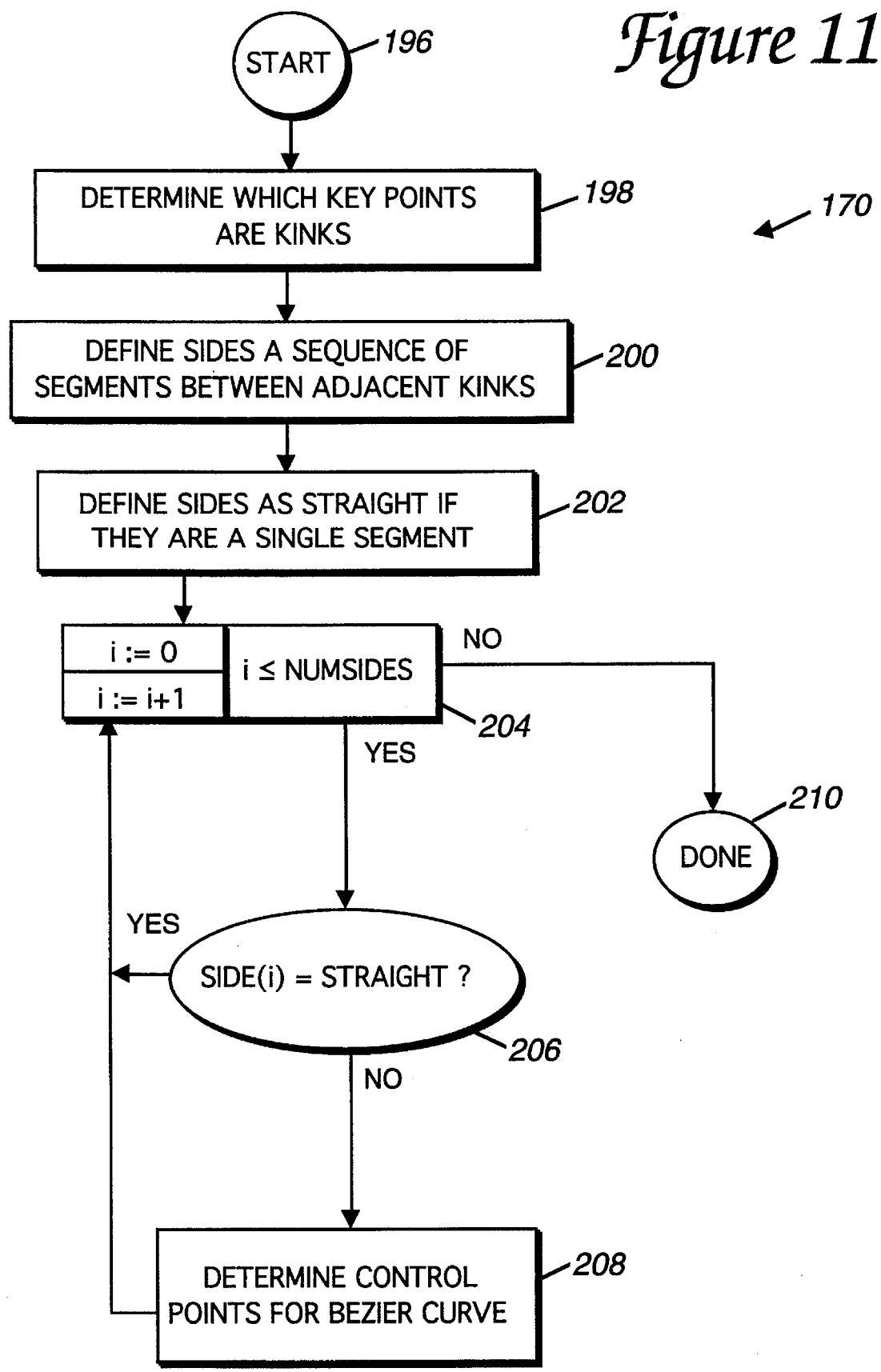
FIG. 11 is a flow diagram of the "determine nature of segments" step of FIG. 9.

FIG. 11 illustrates the step 170 of FIG. 9 in greater detail. Process 170 begins at 196, and a step 198 determines which key points are "kinks", i.e. points which are actual interfaces between two sides. Next, in a step 200, "sides" of an object are defined as a sequence of segments between adjacent kinks. Next, in a step 202, the sides are defined as straight if they comprise a single segment only. An iterative step 204 initializes a counter i to zero, and compares the counter i to the variable NUMSIDES, which holds the number of sides of the graphical object. If the variable i is less than NUMSIDES, it is determined in a step 206 whether the $i^{th}$ side SIDE(i) is straight. If so, process control is returned to step 204 and counter i is iterated. If not, a step 208 determines the control points for the conic or quadratic Bezier curve (preferably by finding tangent vectors) which best represents the side. Process control is then once again turned over to iterative loop step 204. The process 170 is completed when i is greater than or equal to NUMSIDES as indicated in step 210.

Figure 12:
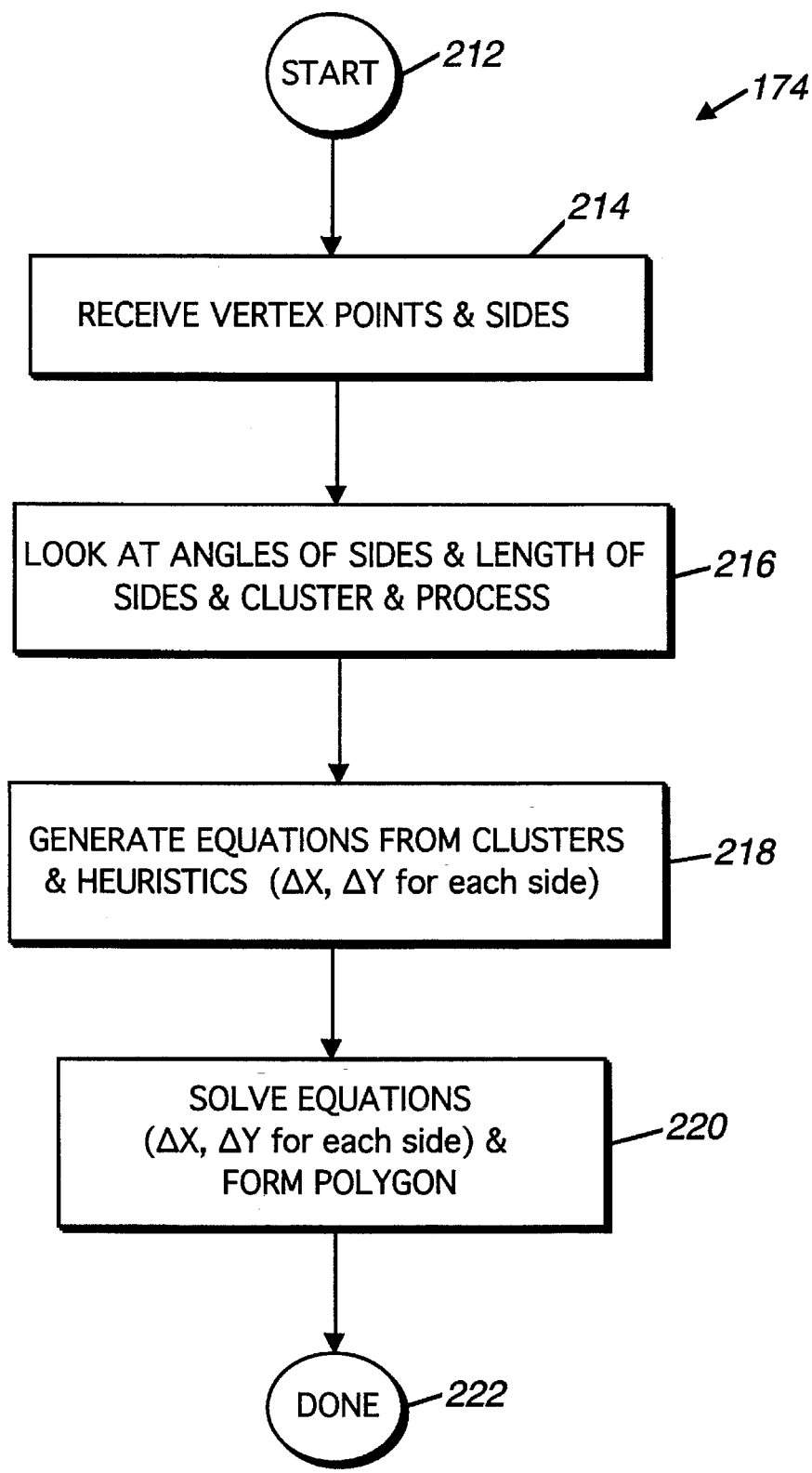
FIG. 12 is a flow diagram of the "form and return a polygon" step of FIG. 9.

FIG. 12 illustrates the step 174 of FIG. 9 in greater detail. The process 174 begins at 212, and the vertex points and sides are received in a step 214. Step 216 looks at the angles of the sides and the lengths of the sides, performs a clustering step, and processes the clustered angles and sides. Next, in a step 218, equations are generated from the clusters and from heuristics built in the system, to determine a $\Delta X$, $\Delta Y$ for each side in a step 218. Finally, in a step 220, a number of simultaneous equations (i.e. $\Delta X$, $\Delta Y$ for each side) are solved, and the polygon is formed. The process is then completed as indicated at 222.

Figure 13A:
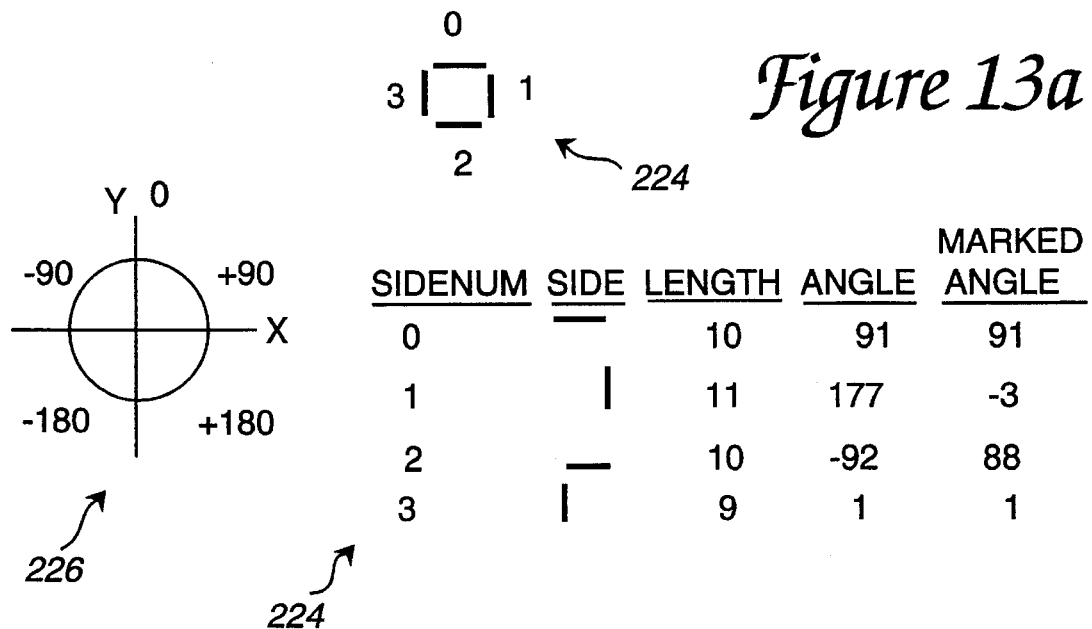
FIGS. 13A–13C help illustrate the "look at angles of sides" step of FIG. 12.
Figure 13B:
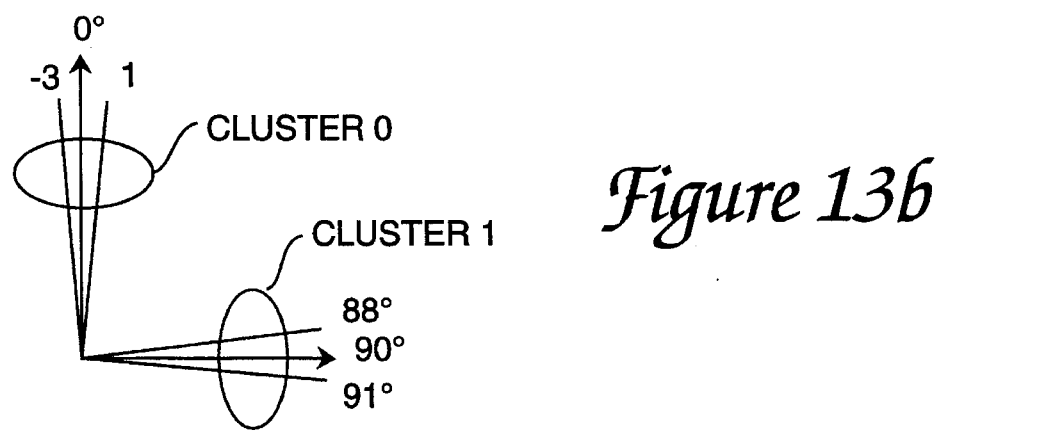
Figure 13C:
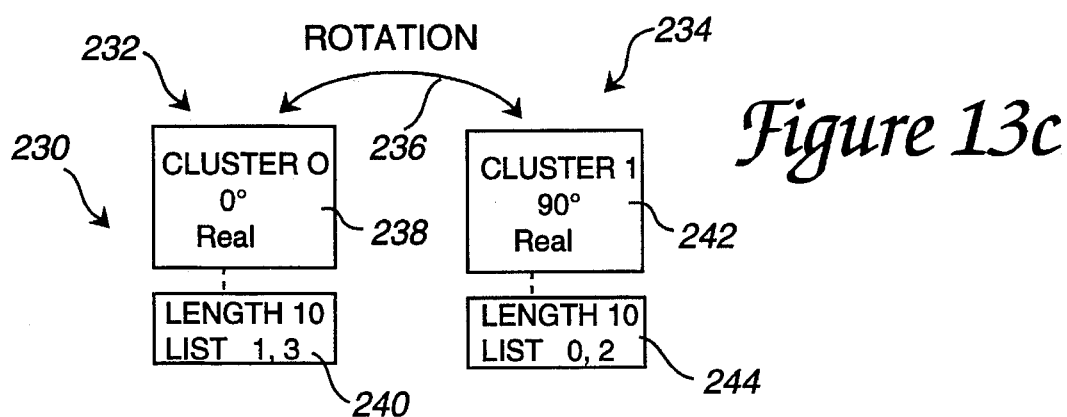

FIGS. 13A–13C illustrate the "cluster and process" step 216 of FIG. 12. In FIG. 13A, a Table 224 has columns SIDENUM, SIDE, LENGTH, ANGLE, and MAPPED ANGLE. The various angles are taken from the coordinate system shown at 226. In the coordinate system of 226, 0° is at the positive, vertical axis, 90° is at the positive, horizontal axis, ±180° are at the negative vertical axis, and –90° is at the negative, horizontal axis. For this example, assume that a square 228 is drawn with sides 0, 1, 2, and 3. Then, in Table 224, side number 0 would be the upper horizontal stroke, which may have a length 10, and an angle of 91°. Similarly, side number 1 would be the right-most vertical stroke having a length of, perhaps, 11 and an angle of 177°. Side number 2 would be the bottom horizontal stroke of length 10 and angle –92°, and side number 3 would be the left-most vertical stroke of length 9 and angle 1°.

As part of the clustering step, all of the angles of the sides are mapped to cluster around the 0° axis and the 90° axis. Side number 0 having an angle 91° is therefore mapped to an angle of 91° (i.e. the same angle). Side number 1 having an angle of 177° is mapped to an angle of –3° by reflecting it around the X axis. Side number 2 having an angle of –92° is mapped to 88°, again by reflecting it around the Y axis. Side number 3 having an angle of 1° is mapped to the same angle.

In FIG. 13B, the mapped angles of Table 224 are shown in graphical form. It can be seen in this figure that side numbers 1 and 3 cluster around the 0° axis, and sides 0 and 2 cluster around the 90° axis. Side numbers 1 and 3 form a first cluster 0, and side numbers 0 and 2 form a second cluster 1. Additional information concerning clustering techniques can be found in *Pattern Classification and Scene Analysis*, of Richard O. Duda & Peter E. Hart, John Wiley & Sons, 1973.

FIG. 13C illustrates a preferred data structure for the sides after the clustering step has been accomplished. The data structure is hierarchical first by angle and then by length. Relationships are also provided between the cluster data structures. For example, the data structure 230 includes a structure 232 for cluster 0, a data structure 234 for cluster 1, and a relationship 236 between the two data structures 232 and 234. The data structure 232 includes a head structure 238 including the cluster number, the cluster angle, and whether the cluster is "real" or "virtual." A real cluster is one formed from the sides of a group, while a virtual cluster is used for a purpose to be discussed subsequently. Data structure 232 also includes a tail structure 240 having a list of included sides, which in this case are sides 1 and 3. The tail structure 240 also lists the length as being 10. If there were other sides in cluster 0 having a substantially different length, such as a length of 15, another tail structure listing those side numbers would be provided for the head structure 238. Similarly, data structure 234 includes a head structure 242 and a tail structure 244. If there were other lengths of sides within cluster 1, additional tail structures would be provided for the head structure 242. The relationship 236 indicates that cluster 1 is a rotation of cluster 0, and vice versa. In the present embodiment, rotation always implies a 90° relationship between two clusters.

Figure 13D:
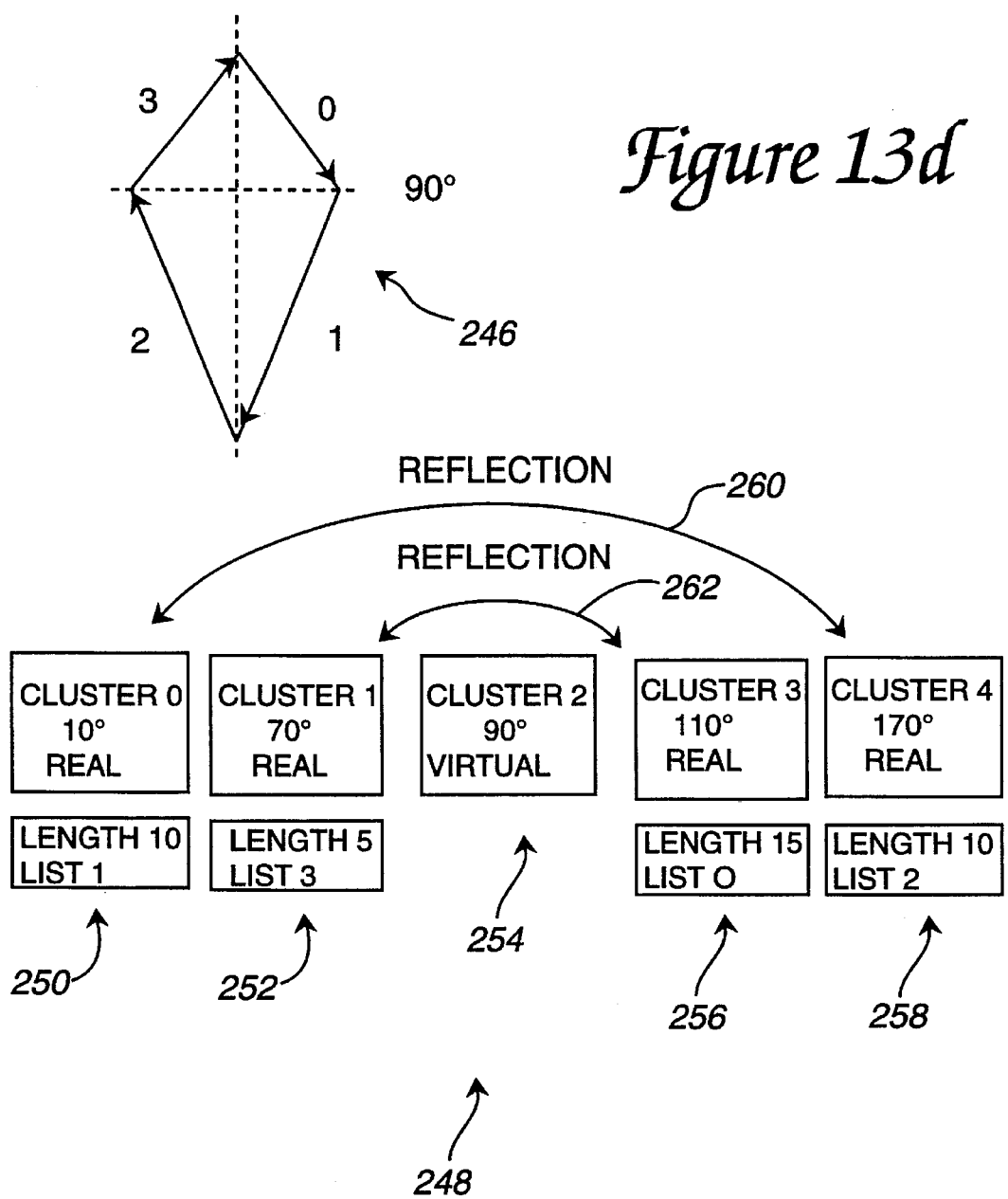
FIG. 13D illustrates the "generate equations" step of FIG. 12.

FIG. 13D will be used to help describe step 218 of FIG. 12. To aid in the discussion, a diamond shaped polygon comprising four strokes 0, 1, 2, and 3, will be used. The diamond shaped polygon 246 undergoes the clustering step 216 of FIG. 12 (as was explained with reference to FIGS. 13A–13C) and a data structure 248 is formed having five clusters numbered 0, 1, 2, 3, and 4. Clusters 0, 1, 3, and 4 are "real" clusters, while cluster 2 is a virtual cluster around the 90° axis. Data structures 250, 252, 254, 256, and 258 are created from the four sides of polygon 246 as indicated. It should be noted that while data structures 250, 252, 256, and 258 all include head structures and tail structures, the data structure 254 includes only a head structure because, as a virtual cluster, it does not include any of the sides of polygon 246.

It should also be noted that a couple of relationships 260 and 262 are provided between clusters of the data structure 248. More specifically, relationship 260 indicates there is a reflection between cluster 0 and cluster 4, and relationship 262 indicates there is a reflection between cluster 1 and cluster 3. In the present embodiment, a reflection is always at 0° or at 90°.

Figure 14:
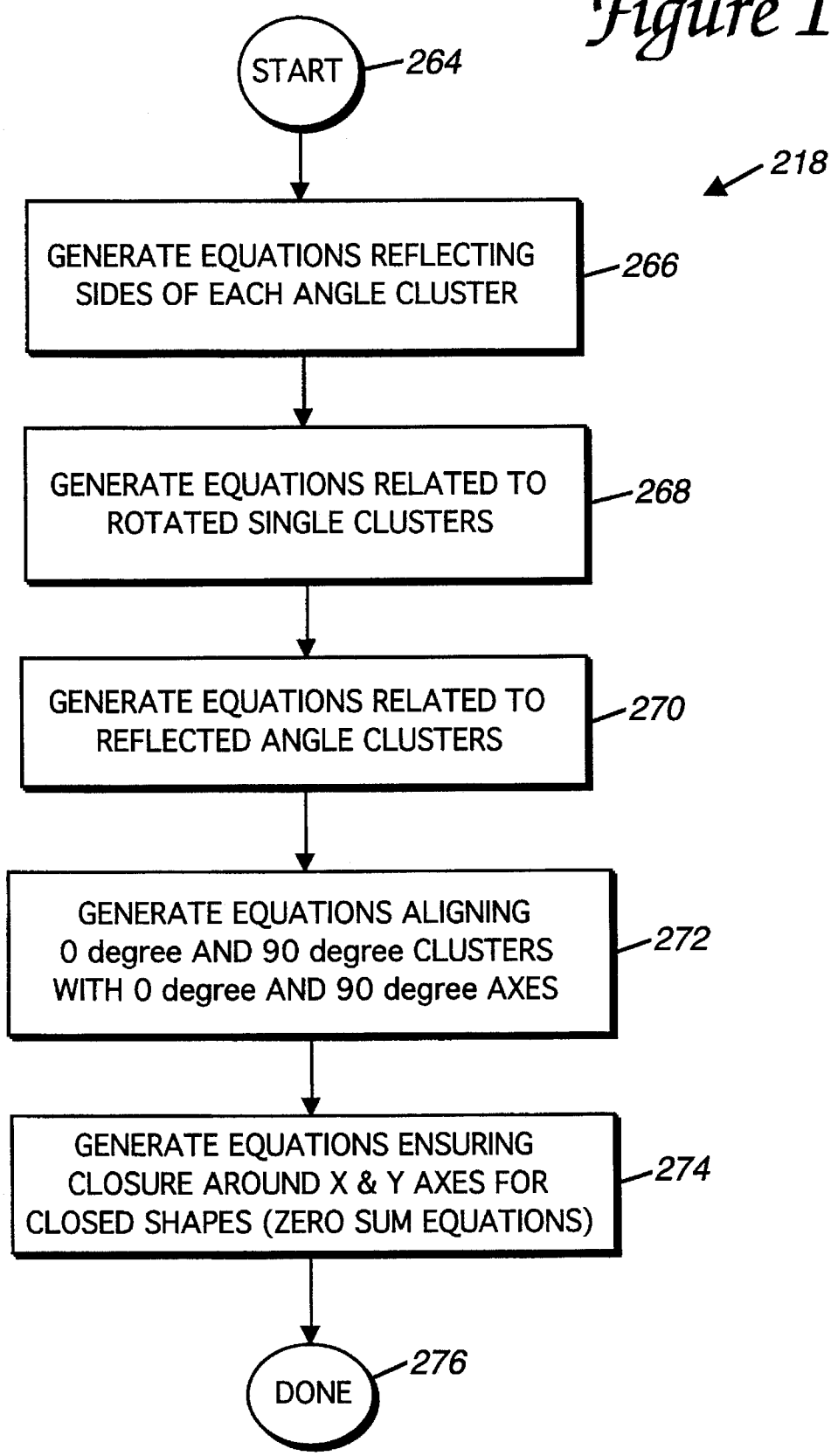
FIG. 14 is a flow diagram giving the process steps for "generate equations" step of FIG. 12.

FIG. 14 illustrates step 218 of FIG. 12 in greater detail. The process 218 begins at 264 and, in a step 266, equations are generated relating the sides of each angle cluster. Next, in a step 268, equations are generated relating rotated angle clusters. In a step 270, equations are generated relating to reflected angle clusters. Next, in a step 272, equations aligning 0° and 90° clusters with 0° and 90° axis, respectively. Finally, in a step 274, equations are generated ensuring closure around the X and Y axis for closed shapes, i.e. zero sum equations are generated. The process 218 is then completed as indicated at 276.

FIG. 15A illustrates, by example, step 266 of FIG. 14. In an Example 1, there are two parallel sides of the same length pointing in opposite directions. The equations generated then are $dx_1=-dx_2$ and $dy_1=-dy_2$. In an example 2, the cluster includes two sides pointing in the same direction, but of unequal length. In this instance, the equations generated are $dx_1=kdx_2$ and $dy_1=kdy_2$, where k is equal to the quotient of the length of the first side to the length of the second side, i.e. k is less than 1.

FIG. 15B illustrates, by example, the step 270 of FIG. 14. In FIG. 15B, a first example includes two sides, pointing in different directions, which are reflected around the Y axis. In this instance, the equations generated are $dx_1=dx_2$ and $dy_1=-dy_2$. In example 2, the cluster again includes two sides, not pointing in the same direction. For this example 2, the equations generated are $dx_1=-kdx_2$ and $dy_1=kdy_2$.

In FIG. 15C, the step 268 of FIG. 14 is illustrated by example. In FIG. 15C, an example 1 has two sides at substantially right angles to each other. In this case, the equations generated are $dx_1=-dy_2$ and $dy_1=dx_2$. In an example 2, the two sides point to a common corner, and again are at right angles to each other. The sides are of unequal length. In this instance, the equations generated are $dx_1=kdy_2$ and $dy_1=-kdx_2$. Again, k is equal to the ratio of the length of the shorter side to the longer side.

Figure 15D:
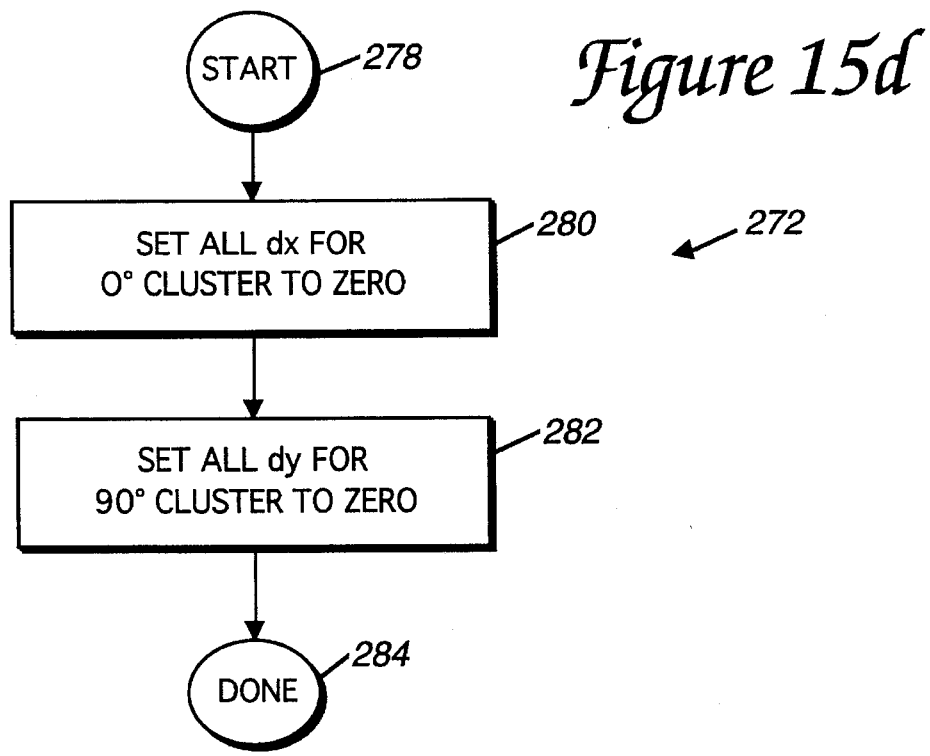
FIG. 15D is a flow diagram of the "generate equations aligning 0° and 90° clusters" step of FIG. 14.

FIG. 15D illustrates the step 272 of FIG. 14 in greater detail. The process 272 starts at 278, and all dx for the 0° cluster are set to zero in a step 280. Next, in a step 282, all the dy for the 90° clusters are set to zero. These two steps 280 and 282 effectively align the 0° and 90° clusters with the 0° and 90° axis, respectively. The process 282 is completed at step 284.

Figure 15E:
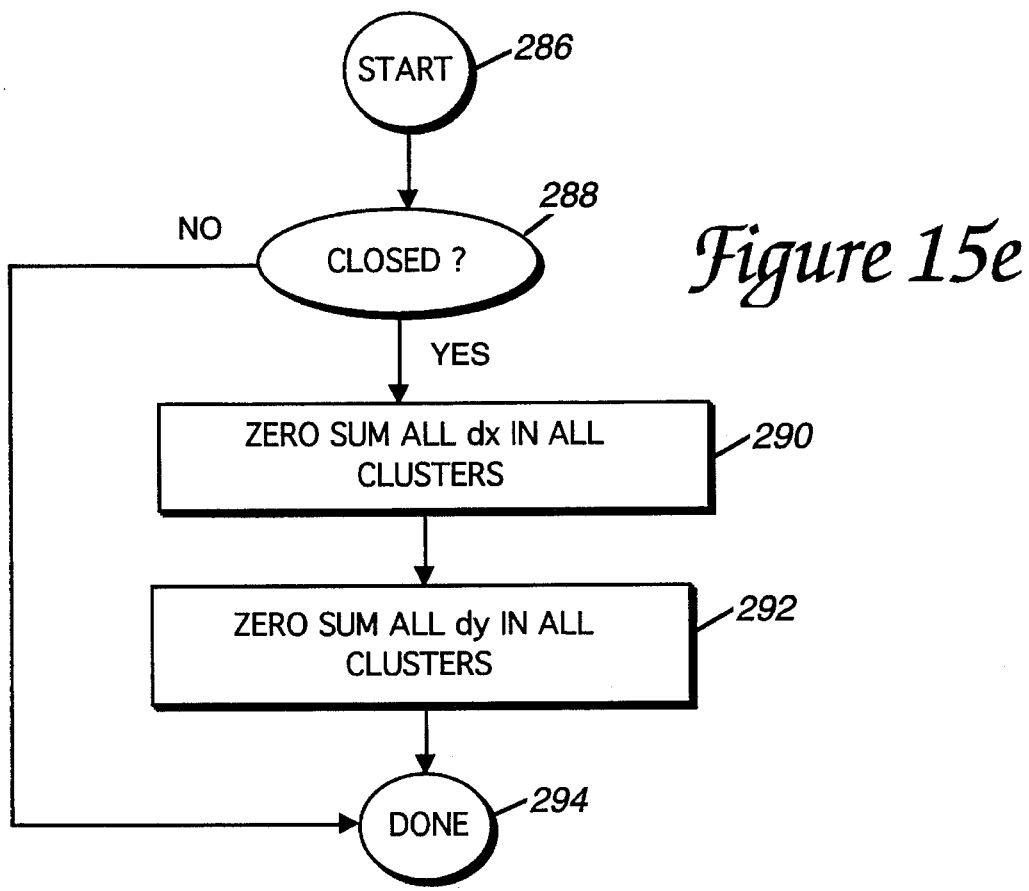
FIG. 15E is a flow diagram illustrating the "generate equations ensuring closure" step of FIG. 14.

FIG. 15E illustrates step 274 of FIG. 14. The process 274 begins at 286, and a decision step 288 determines whether the polygon is closed. This can be easily determined by finding the distance between the beginning point to the first stroke and the ending point of the last stroke and, if this distance is greater than a predetermined value, determining that the polygon is open. If it is determined that the polygon is closed, step 290 performs a zero sum of all dx in all clusters; i.e. $dx_0+dx_1+\ldots +dx_n=0$. Next, in a step 292, there is a zero of all dy in all clusters; i.e. an equation is generated where $dy_0+dy_1+\ldots +dy_n=0$. The process 274 is completed at 294.

Figure 16:
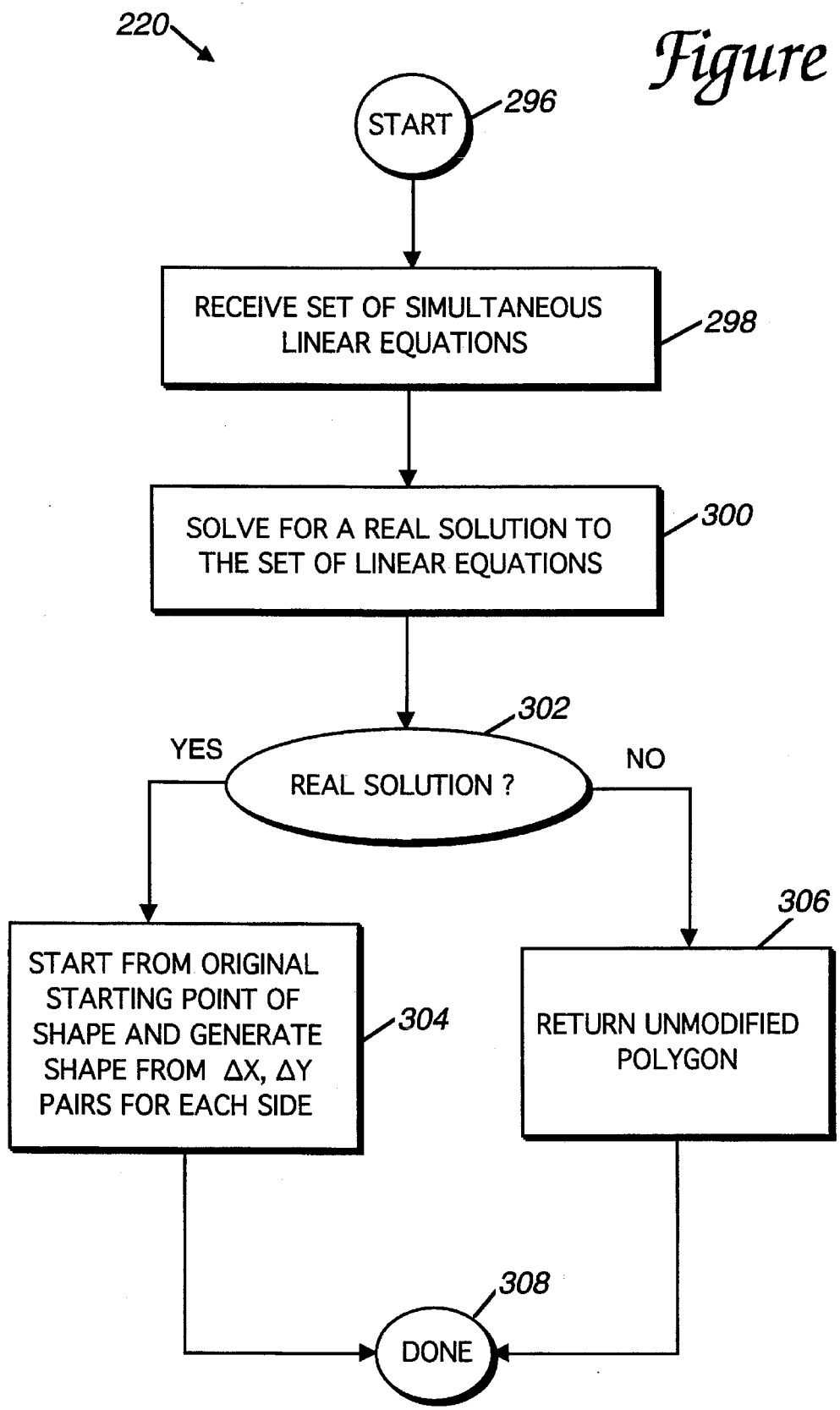
FIG. 16 is a flow diagram illustrating the "solve equations" step of FIG. 12.

FIG. 16 illustrates the "solve equations" step 220 of FIG. 12 in greater detail. The process 220 starts at 296, and a set of simultaneous linear equations (generated as described above) are received in a step 298. Step 300 attempts to find a real solution to the set of linear equations. There are, of course, many commercially available algorithms for solving simultaneous linear equations. It is then determined in a step 302 whether there is a real solution to the set of simultaneous linear equations. If there is a real solution, a polygon is formed starting from the original starting point of the shape and progressing from the $\Delta X$, $\Delta Y$ pairs for each progressive side. The process is then complete as indicated at 308. If step 302 determines that there is not a real solution to the set of simultaneous linear equations, the polygon is returned in an unmodified form in a step 306, and the process is again completed at 308.

Figure 17:
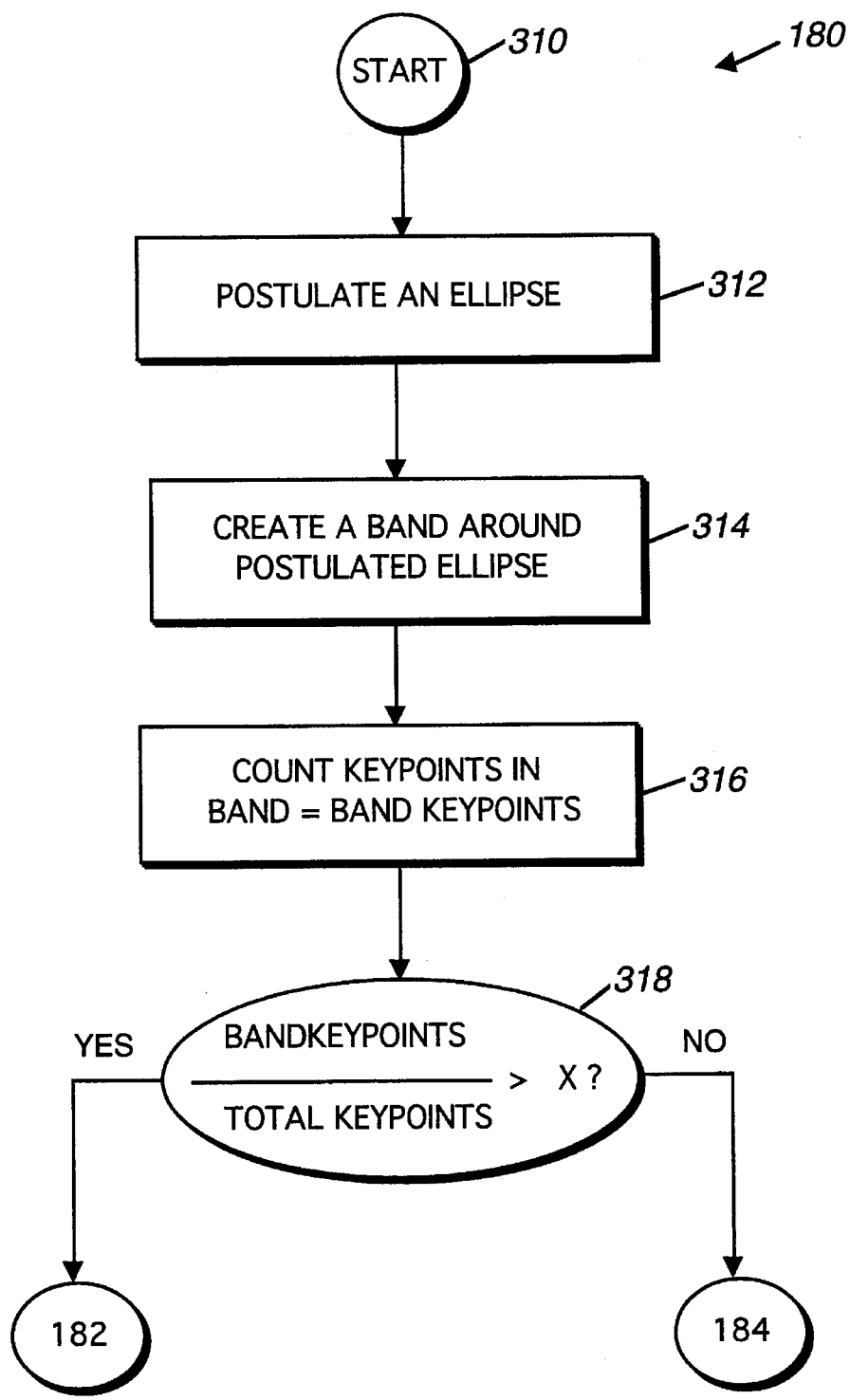
FIG. 17 is a flow diagram illustrating the "circle or ellipse" step of FIG. 9.

FIG. 17 illustrates step 180 of FIG. 9 in greater detail. The process 180 begins at 310, and an ellipse is postulated in a step 312. Next, in a step 314, a band is created around the postulated ellipse and, in a step 316, the number of key points of the postulated ellipse that fall within the band are counted and stored within a variable BANDKEYPOINTS. Next, in a step 318, the quotient of BANDKEYPOINTS to the total number of key points is calculated and, if the quotient is greater than a predetermined value X, process control is returned to step 182 of FIG. 9. If the quotient is less than or equal to the value X, process control is returned to step 184 of FIG. 9.

Figure 18:
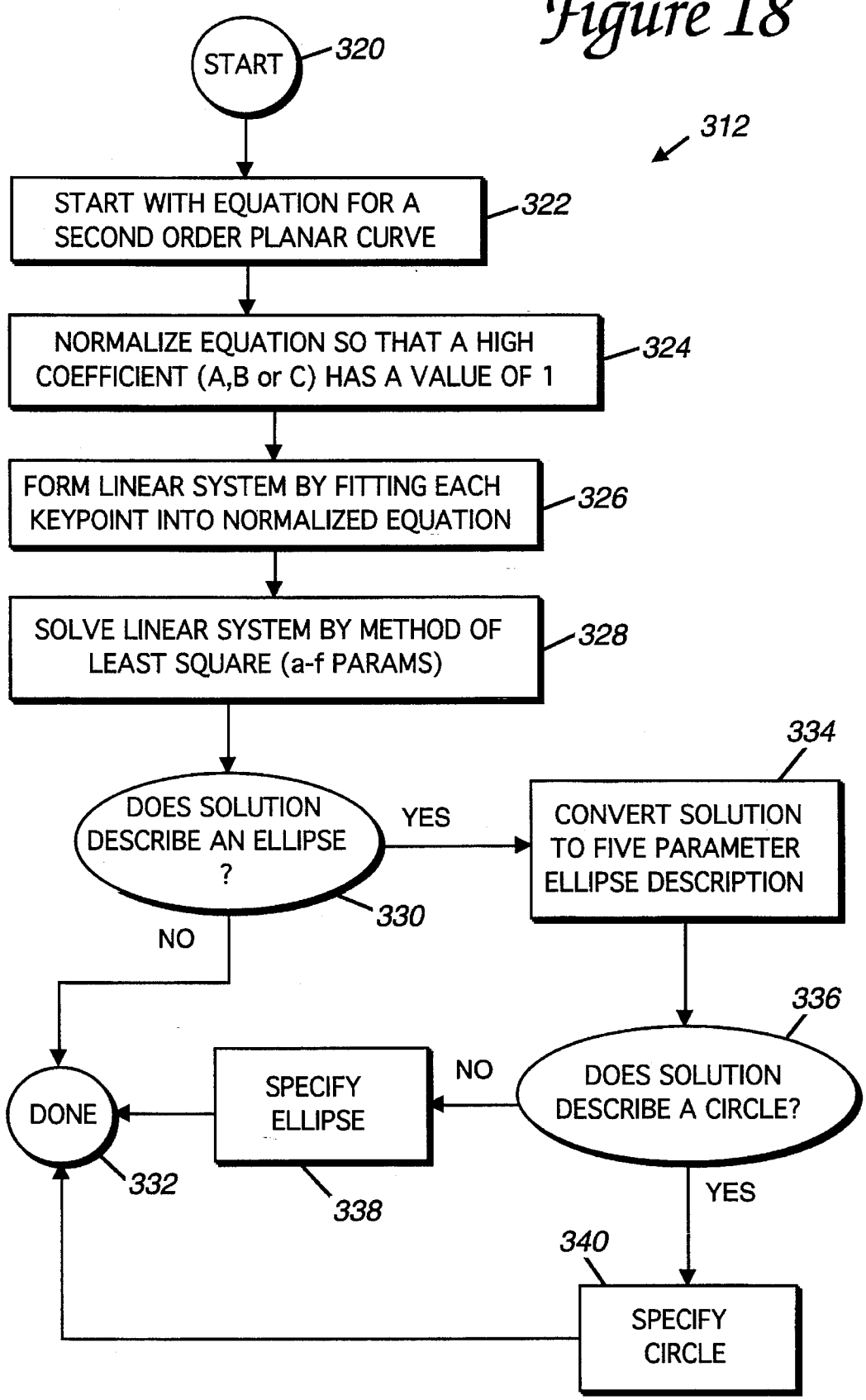
FIG. 18 is a flow diagram of the "postulate an ellipse" step of FIG. 17.

FIG. 18 illustrates step 3 12 of FIG. 17 in greater detail. Process 312 begins at 320, and in a step 322 the process starts with the equation for a general second order planar curve. As is well known to those skilled in the art, the equation of step 322 is of the form:

$$ax^2+bxy+cy^2+dy+ey+f=0$$

Next, in a step 324, the above equation is normalized so that one of the high-level coefficients (i.e. a, b, or c) has a value of 1. This avoids trivial solutions to the simultaneous equations to be solved subsequently. In step 326, a linear system is formed by inserting each key point (x,y) into the normalized equation. Step 328 then solves the linear system by the well-known least-squares method, i.e. the coefficients a–f are determined. Step 330 determines whether the coefficients describe an ellipse. Again, methodologies for determining whether a certain set of coefficients in a general second order planar curve form ellipses and other shapes are well known to those skilled in the art. If the coefficients do not describe an ellipse, the process 312 is completed at 332. If they do describe an ellipse, the a–f coefficients are converted to a more conventional five-parameter description of an ellipse. The five parameters are the (x,y) coordinates of the center of the ellipse, the small radius a, the large radius b, and the angle $\beta$ at which the ellipse is tilted relative to standard Cartesian coordinates. In step 336, it is determined whether the solution describes a circle, e.g. by examining the ration of a/b. If the ratio a/b is sufficiently close to 1, the ellipse can be assumed to be a circle. If the solution does describe a circle, it is specified as a circle in step 340 and the process is complete at 332. If the solution does not describe a circle, an ellipse is specified in step 338 and the process is again complete at 332.

Figure 19:
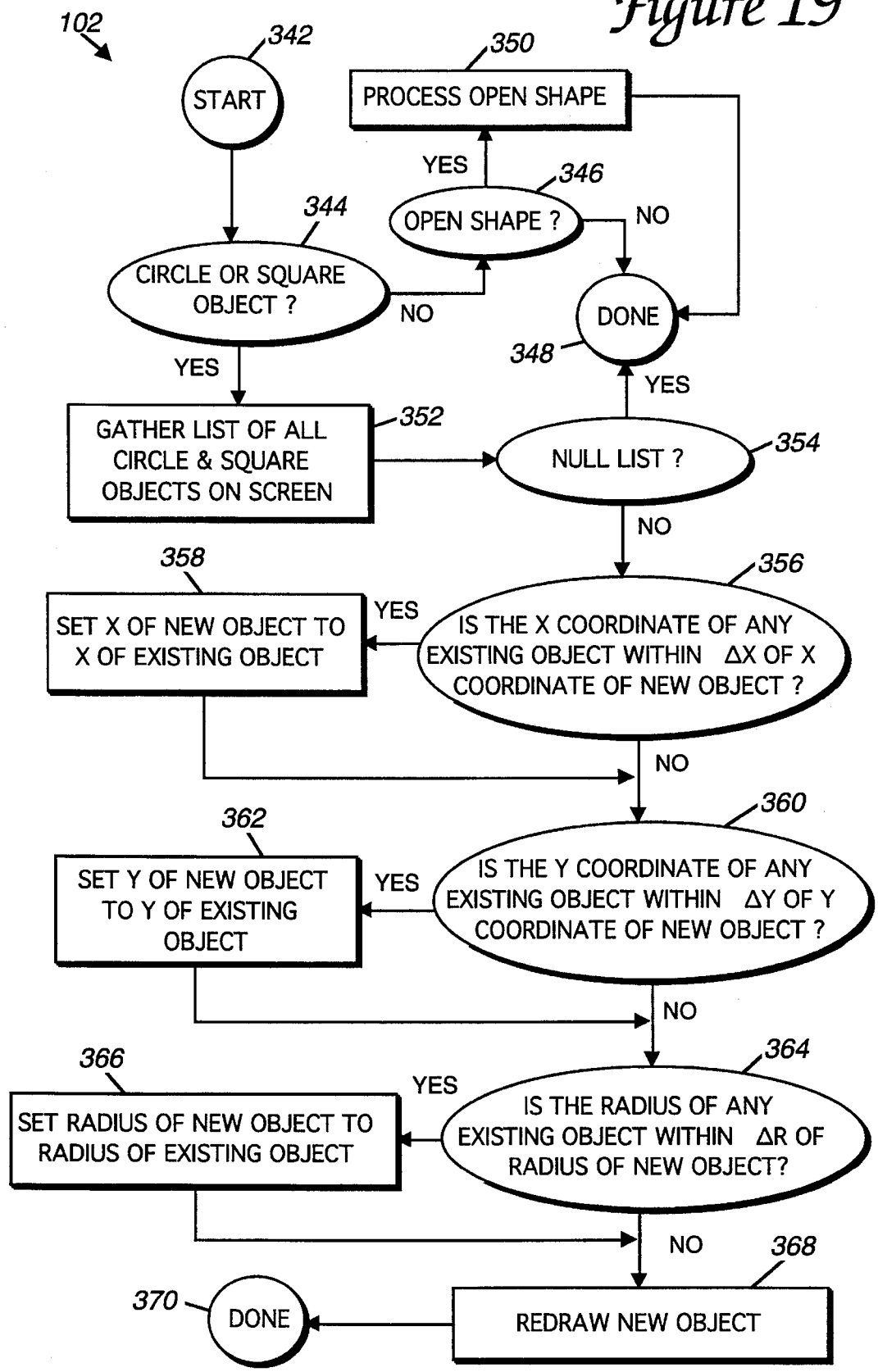
FIG. 19 is a flow diagram of the "look for related shapes" step of FIG. 4.

FIG. 19 illustrates step 102 of FIG. 4 in greater detail. The process 102 begins at 342 and, in a step 344, it is determined whether the recognized object is of a special limited class. In this case, the class comprises self-similar objects such as circles and squares. In other embodiments, this process can be generalized to other classes of objects. If the object is not a circle or a square, a step 346 determines whether it is an open shape. If it is, step 350 processes the open shape and the process is completed at 348. If it is not an open shape, the process is again complete at 348.

If the object is a circle or a square as determined by step 344, a step 352 gathers a list of all like objects on the screen. If step 354 determines that there are not any like objects, the process is complete at 348. If there are like objects, a step 356 determines if the x coordinate of any existing like object is within a small amount $\Delta x$ of the x coordinate of the new object. If it is, a step 358 sets the x coordinate of the new object to the x coordinate of the existing object. In step 360 it is determined if the y coordinate of any existing like object is within a small amount $\Delta y$ of the y coordinate of the new object. If it is, a step 362 sets the y coordinate of the new object to the y coordinate of the existing object. In step 364 it is determined if the radius of any existing like object is within a small amount $\Delta r$ of the radius of the new object. If it is, a step 366 sets the radius of the new object to the radius of the existing object. The new object is then re-drawn in a step 368, and the process is complete at 370.

The effect of process 102 of FIG. 19 is to align and conform like objects on the screen of the computer. For example, if a first square is drawn, and then a second square is drawn to its right, the process 102 will attempt to align the squares along the same x axis and to make the sides (i.e. radius of the square) the same. If a circle is drawn, and a substantially larger circle is drawn around it, the circles will become concentric (but not of the same radius), because the process 102 will attempt to align the two circles around the same x and y axes. Since users often attempt to produce graphics in concentric or rectilinear fashions, the process 102 can be very useful.

Figure 20:
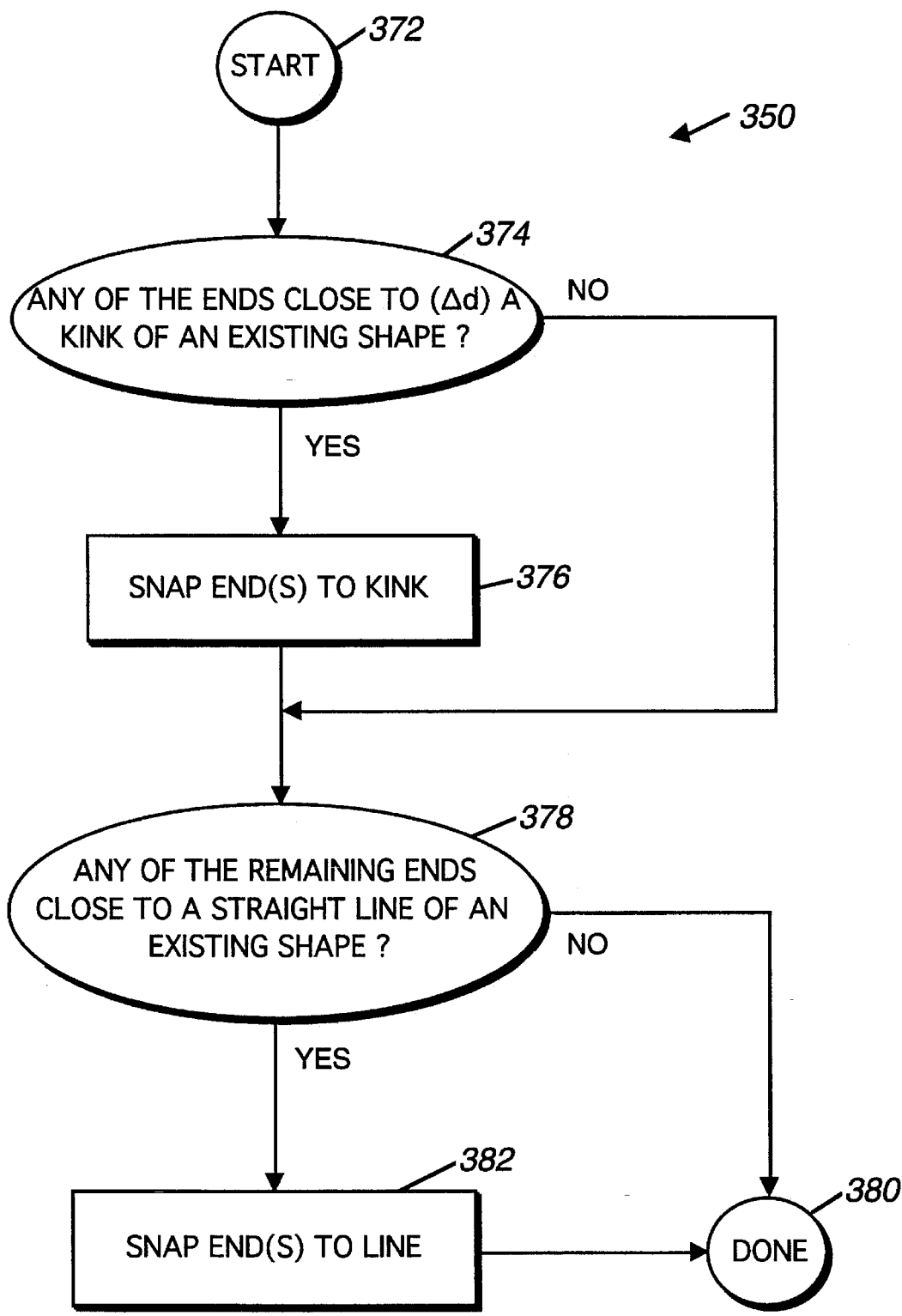
FIG. 20 is a flow diagram of the "process open shape" step of FIG. 19

FIG. 20 illustrates step 350 of FIG. 19 in greater detail. Process 350 begins at 372 and, in a step 374, determines whether any of the ends of the open shape are close (i.e. a small Δd from) to a kink of an existing object. If it is, the open end or ends are "snapped" to the kinks of the existing object in a step 376, i.e. the open object is moved so that the open ends or end abut the kink or kinks of the existing object. Next, in a step 378, it is determined whether any of the remaining ends of the open shape are close (i.e. a small Δd') to a straight line of an existing shape. If so, the end or ends are "snapped" to the end of the straight line(s) by extending the open shape to the line in a step 382. The process is completed at 380. In preferred embodiments, Δd is greater than Δd' so that open ends are snapped to kinks more aggresively than to straight lines. It has been found that for many hand-drawn objects, a Δd of no more than about 10 pixels (e.g., about 0.13–0.14 inches) and a Δd' of no more than about 10 pixels provide an aesthetically pleasing result to many observers. To ensure that the open ends snap more aggressively to kinks than lines, Δd is preferably set a value that is about 2 pixels less than the value of Δd', so long as Δd remains non-negative.

Figure 21A:
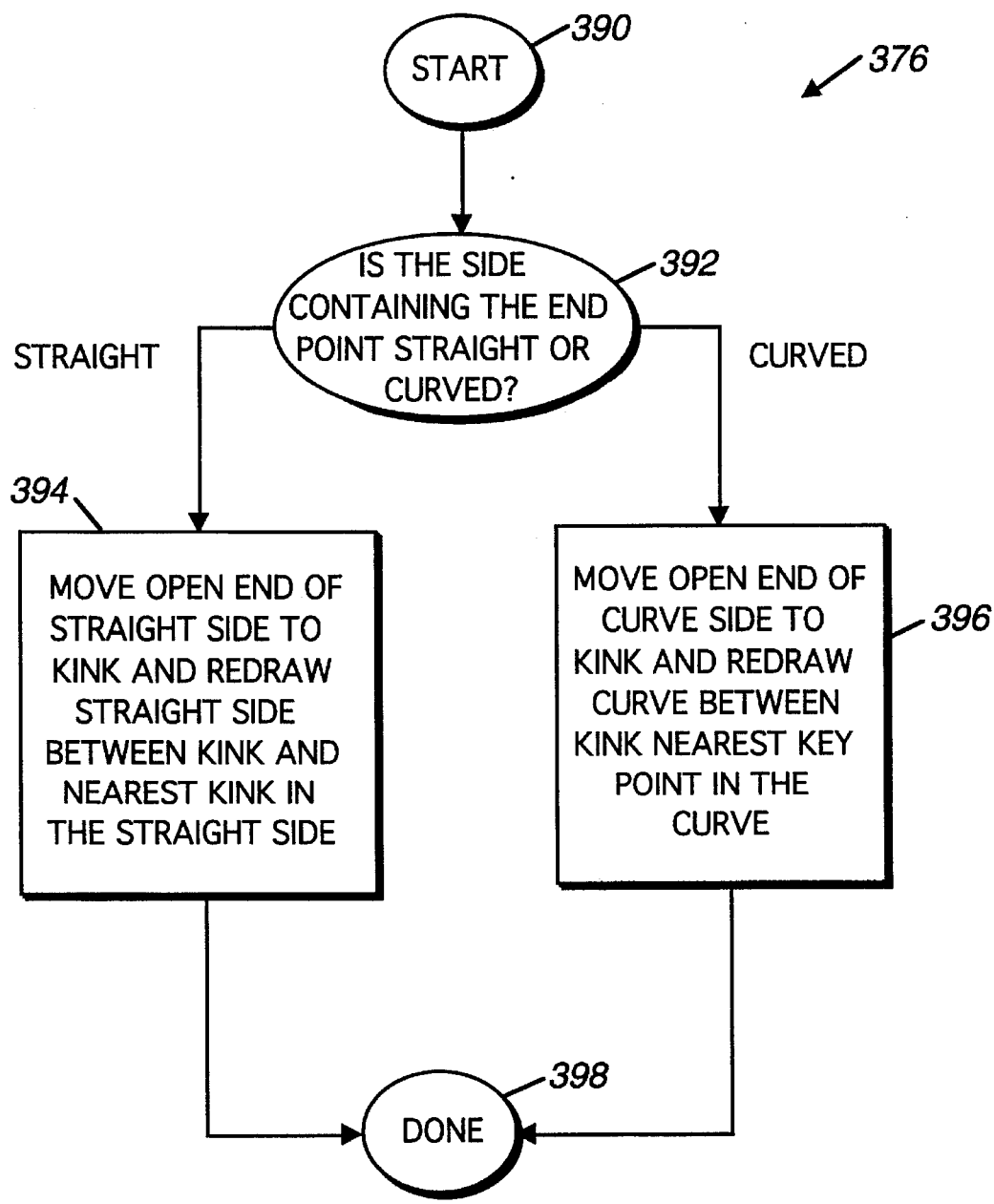
FIGS. 21A and 21B are flow diagrams of the "snap end to kink" step and the "snap end to line" step of FIG. 20.
Figure 22A:
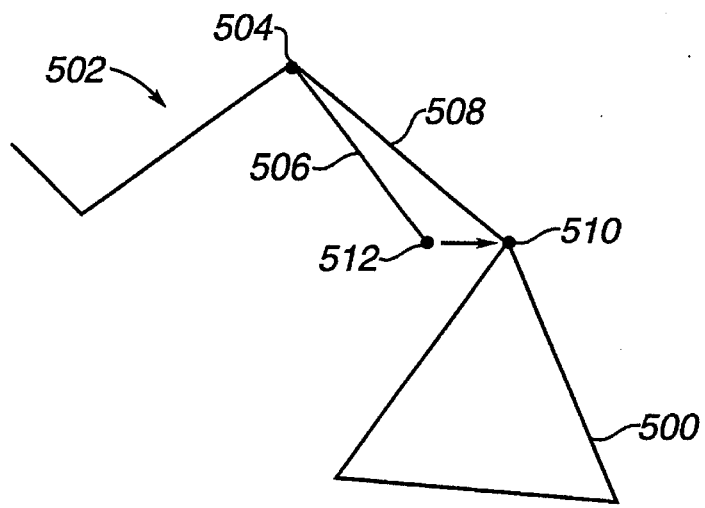
FIGS. 22A–22D are graphical depictions of the processes shown in FIGS. 21A and 21B.
Figure 22B:
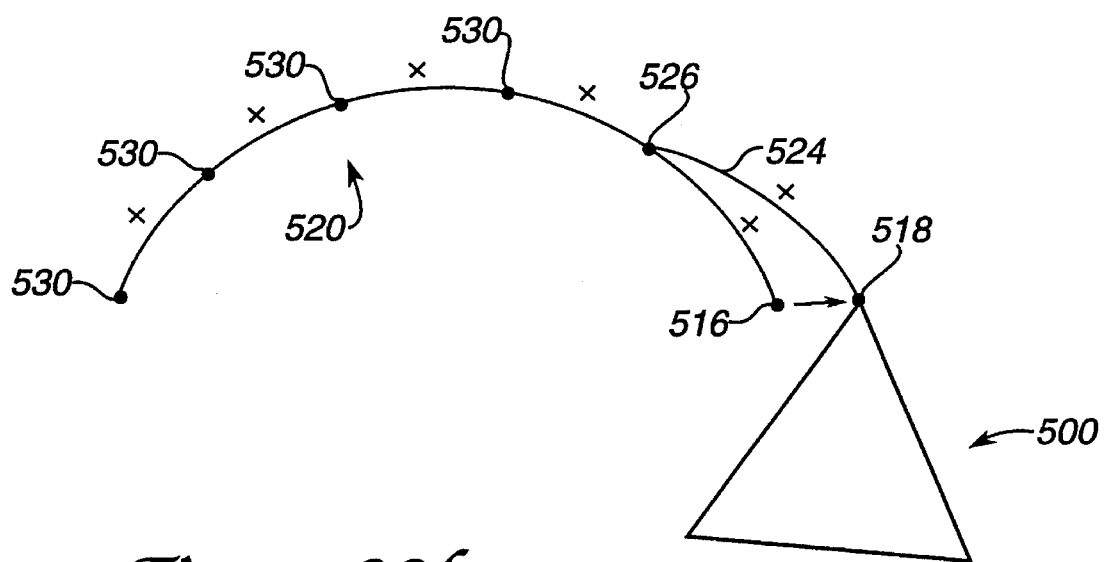

The step of snapping the open end or ends to a kink or kinks of an existing object (step 376) is detailed in FIG. 21A. Generally, this involves redrawing the curve or straight line containing the open end. The process begins at 390 and in a decision step 392, determines whether the segment containing the end point is straight or curved. FIG. 22A shows an example of an endpoint 512 that is part of a straight line segment and FIG. 22B shows an example of an endpoint 516 that is part of a curved segment. These two different types of segments are snapped to a kink by different mechanisms. It decision step 392 determines that the end point is part of a straight line segment, a step 394 moves the open end of the straight segment to the kink of the existing object and then redraws a straight side between that kink and nearest kink in the straight segment as shown in FIG. 22A. The process is then completed at 398. If decision step 392 determines that the segment containing the end point under consideration is curved, a step 396 moves the open end of the curve segment to the kink of the existing object and then redraws the curve between the kink and the nearest key point in the curve. This is not quite as simple as the process of drawing a line to the kink. In the case of a curve, the key point nearest the end point must first be identified. Then, the curve between that point and the kink of the existing object must be redrawn as described below. The remainder of the curved segment (i.e., that portion of the curve beyond the penultimate key point) remains unchanged. This is much more computationally efficient than redrawing the entire curved segment and it generally provides a smooth curved transition between the previously open-ended curve and the kink.

The process of snapping to a kink is graphically depicted in FIGS. 22A and 22B. In FIG. 22A, an open-ended shape 502 with a straight line segment is shown having an initial open end point 512 and a kink 504. A straight line 506 connects these two points. When the open-ended shape 502 is snapped to a kink 510 in closed shape 500, initial end point 512 is replaced with kink 510, and a new line 508 is drawn to kink 504, which has not moved. FIG. 22B shows the corresponding process for a shape 520 containing a curved end segment. Like the case of a shape containing a straight line, this process involves replacing an end point 516 of an initial curve segment 522 with a new end point 518 defined by a kink in closed object 500. However, the process of redrawing the curve is more complicated than redrawing the line as depicted in FIG. 22B.

When the system of this invention takes a series of input points defining an apparent curve (as drawn on the screen by the user), those points are fit to a smooth continuous curve defined by a mathematical expression such as a quadratic or cubic spline. As shown in FIG. 22B, a curve fit according to this invention contains various key points along the curve (the dots 530 on the curve), including the end point 516 which is itself a key point. As noted, key points may be the interface between two sides of a graphical object. In curves, they also serve as parameters used in the mathematical expression defining the curve. Together with the key points, control points (shown as "x"s) located off the curve completely define the spline. In a quadratic (also known as "conic") spline fit (shown in FIG. 22B), one control point is provided between each two key points. In a cubic spline fit (not shown), two control points are provided between each two key points (and so on). This invention preferably employs a quadratic spline fit of the data points.

As noted, when a curve is snapped to a close kink 518 in an existing object, the end point 516 (a key point) of the curve is replaced with the kink in the existing object. The penultimate key point 526 and the control point between the penultimate and end key points in the curve remains at their original positions. The curve is then redrawn (524) as defined by the expression for the quadratic spline including the locations of the control and key points (i.e., between the penultimate key point and the new end point at the kink). The process of snapping to an existing object is thereby completed.

Figure 21B:
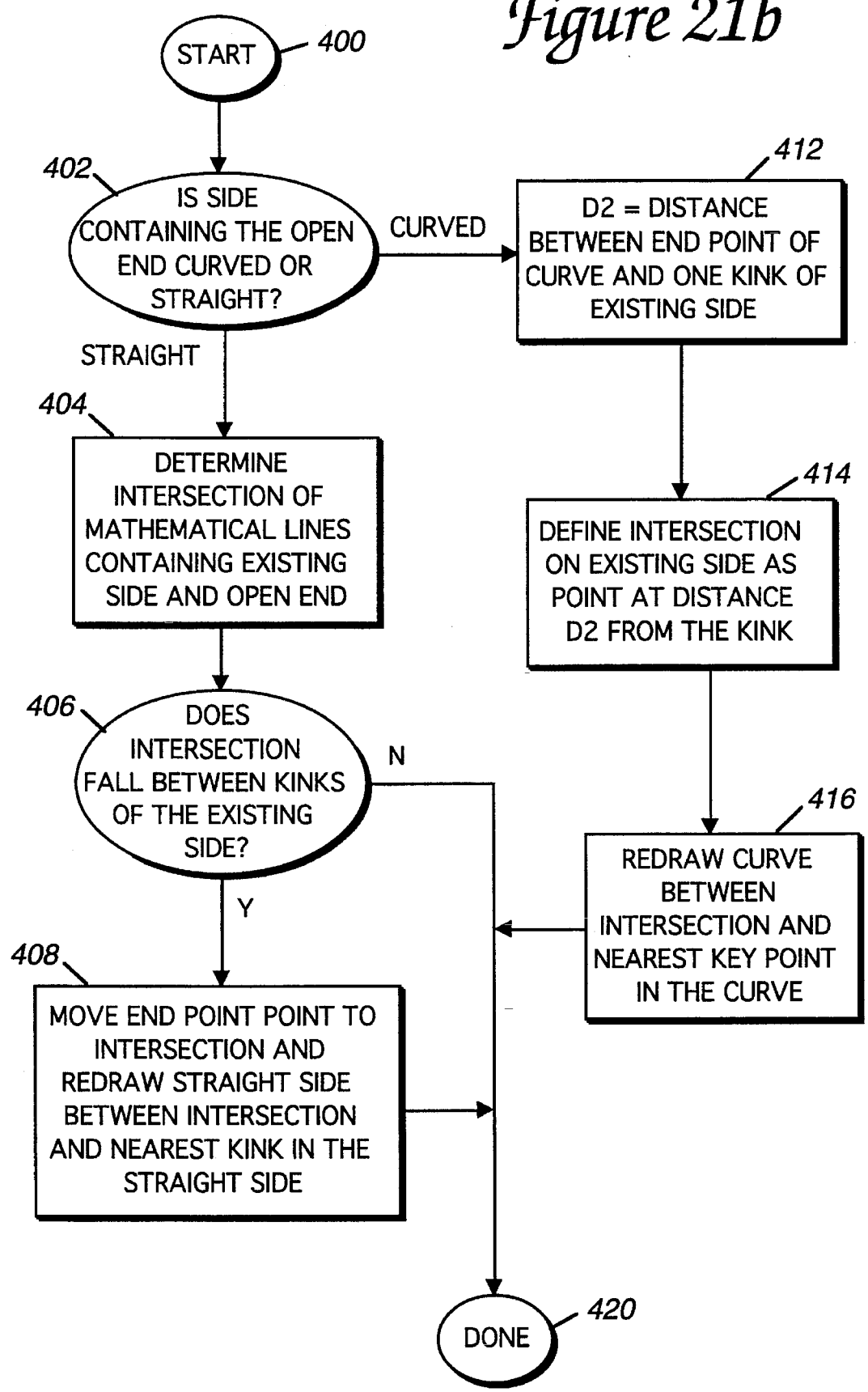
Figure 22C:
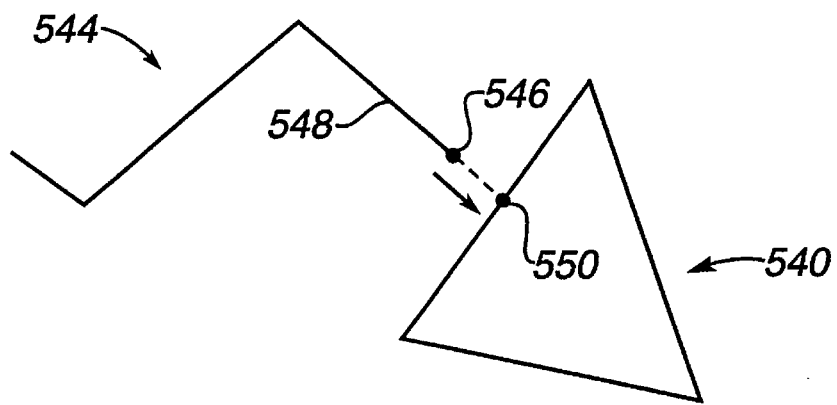

The step 382 of snapping an open end to a straight side of an existing object is detailed in FIG. 21B. Assuming that the end point of an open object is within Δd' of the straight side, the process of snapping to that side contains two primary steps. First, the intersection between the open object and the side is determined, and next, the open ended object is redrawn so that it ends at the intersection. How these two primary steps are performed depends upon whether the open end is part of a curve or a straight line segment. The process begins at 400 and in a decision step 402, it is determined whether the segment containing the end point is straight or curved. If it is straight, a step 404 determines the intersection between mathematical lines containing (1) the straight side of the existing object and (2) the straight segment containing the open end. This can be accomplished by simply determining the equations for both lines and determining their unique intersection. Thereafter, a decision step 406 determines whether that intersection point lies within the existing object (i.e., between the two kinks defining the straight side of the existing object). If so, the end point of the open shape is replaced with the intersection point and a line segment is redrawn between that point and the penultimate kink in the previously open shape in a step 408 as shown in FIG. 22C. The process is then completed at 420. If decision step 406 determines that the intersection point lies outside of the existing object, the side of the existing object is not redrawn (because there is no true intersection with the existing object) and the process is completed at 420.

If decision step 402 determines that the segment containing the open end is curved, a step 412 determines the distance d2 between the end point of the open shape and a first kink of the two kinks defining the straight side of the existing object. Thereafter, a step 414 determines an intersection point which is located a distance d2 from the first kink. Next, a step 416 redraws the curve between the intersection and the nearest key point on the previously open-ended shape. The process is then completed at 420. The process of redrawing the curve between the penultimate key point and the new end point (the intersection point) may be accomplished by the same procedure employed to snap a curve to a kink of an existing object (as described for step 396 and FIG. 22B).

Figure 22D:
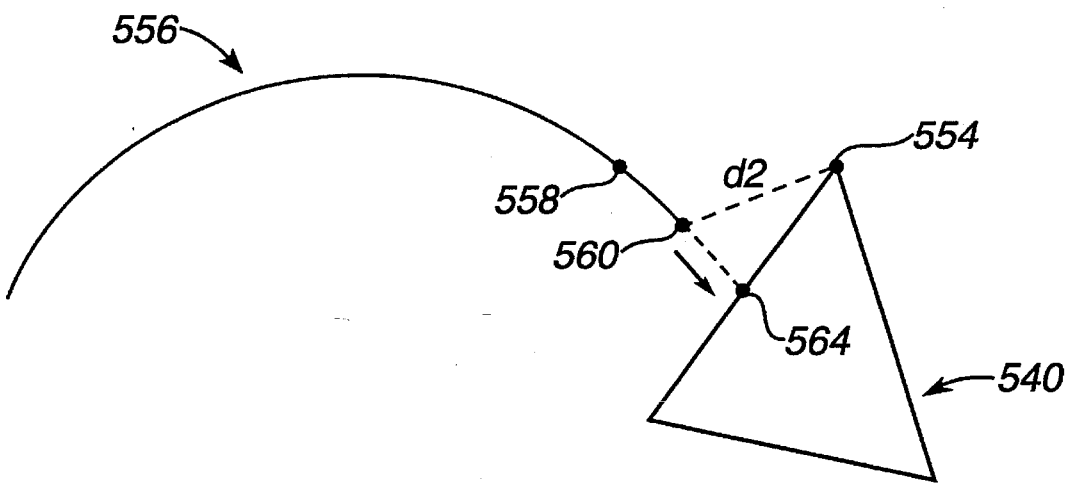

FIGS. 22C and 22D graphically depict the process of snapping straight and curved segments to a straight side of an existing object. In FIG. 22C, a shape 544 having an end point 546 as part of a straight segment 548 is joined to an intersection point 550 on closed object 540 by extending segment 548 to point 550. In FIG. 22D, an open shape 556 having an end point 560 and a penultimate key point 558 is jointed closed object 540 at an intersection point 564. Intersection point 564 lies on a straight side of object 540 at a distance of d2 from kink 554, the same distance separating end point 560 from kink 554. The curve connecting the previously open shape 556 with closed object 540 is drawn between penultimate key point 558 and new key point (intersection point) 564 by a quadratic spline as described above.

In the alignment processes described in connection with FIG. 19, new circle or square objects drawn on the screen were aligned with existing objects under certain conditions. More specifically, when the new object's alignment parameter (e.g., the X coordinate of its center) fell within a predefined distance of that same parameter for an existing object, the position or size of the new object was set equal to that of the existing object. This simply involved checking the $\Delta x$, $\Delta y$, or $\Delta R$ of the new object and the existing objects (as is done in steps 356, 358, 360, 362, 364, and 366 of FIG. 19). In the approach depicted in FIG. 19, the $\Delta$ parameters may be treated as constants. However, in an alternative embodiment, these parameters are allowed to vary according to a trend analysis dictated by the location, size, and number of objects previously drawn on the screen. Briefly, this involves the attempting to add each new object to an existing cluster of objects so that the new object adopts the x value (or y value or size) ascribed to the cluster. If the new object cannot be fit within an existing cluster, it is used to start a new cluster.

The analysis described below applies equally to determining the x value, the y value, the R value, or some other alignment parameter of a new object. For each type of alignment parameter, a different set of clusters is formed. In other words, the following FIGS. 22A–D (depicting the clustering approach to alignment) could be used in place of any of steps 356–358, 360–362, and/or 364–366 of FIG. 19. In each case, the first object in each cluster fixes the alignment parameters of that cluster, and each object added to the cluster thereafter takes on these alignment parameters. As new objects are added to the cluster, some statistical parameters of the cluster (e.g. it center and variance) change, thus changing the strength with which the cluster will attract new objects.

Figure 23A:
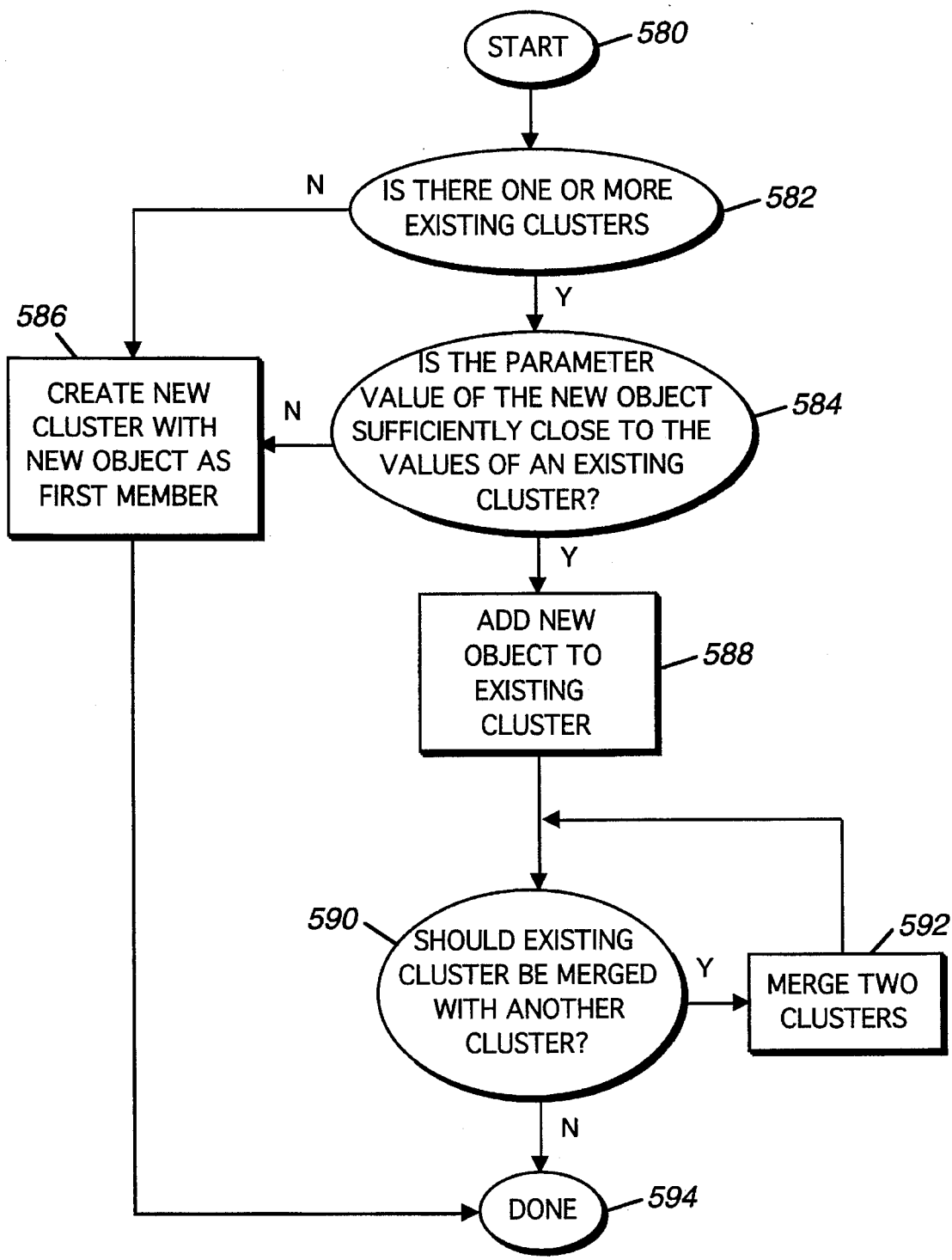
FIGS. 23A–23D are flow diagrams detailing a prefected embodiment for aligning certain objects added to an existing collection of objects.

An overview of this process is depicted in FIG. 23A. The process begins at 580 and proceeds to decision step 582 which determines whether there are one or more clusters already in existence. If there are no such clusters now existing, a step 586 creates a new cluster which contains the new object as its first member. Thereafter the procedure is finished at 594. If decision step 582 determines that there is in fact one or more existing clusters, a decision step 584 determines whether the parameter value under consideration (e.g. the x value) of the new object is sufficiently close to the values of an existing cluster. The considerations involved in making this decision, including what "sufficiently close" means, will be described in more detail in FIGS. 23B and 23C. If decision step 584 determines that the new objects parameter value is not "sufficiently close" the new object is used as the first member of a new cluster in step 586. Thereafter the processes is concluded at 594. If, however, decision step 584 determines that a parameter value of the new object is sufficiently close to the parameter values of an existing cluster, a step 588 adds a new object to that existing cluster. Thereafter, a decision step 590 determines whether the existing cluster (to which the new object had been added) should be merged with an adjacent cluster. If not the process is concluded at 594. If, on the other hand, decision step 590 determines that the two clusters should be merged, a step 592 merges the two clusters. Thereafter, process control is returned to step 590 which determines whether the newly formed "merged" cluster should be merged with yet another cluster. This procedure (moving between steps 590 and 592) is repeated until no further mergers are appropriate. The process is then completed as described above.

The step of adding a new object to a existing cluster (step 588) involves two steps. First, the new object is aligned with the existing cluster. This might involve, for example, adjusting the new objects x value so that it agrees with the value of the first object in the existing cluster. After the alignment has taken place, the second step in the process involves adjusting the statistically defined parameters of the existing cluster to reflect the presence of the new object. In this step, the parameter values of each member of the cluster are analyzed to determine at least a center and a variance for the cluster. These new statistical parameters will dictate how strongly the cluster attracts future objects. The step of merging two clusters (step 592) likewise involves determining new centers and variances for the merged new clusters. The actual positions of the objects within the merged clusters are not changed by the merger.

Figure 23B:
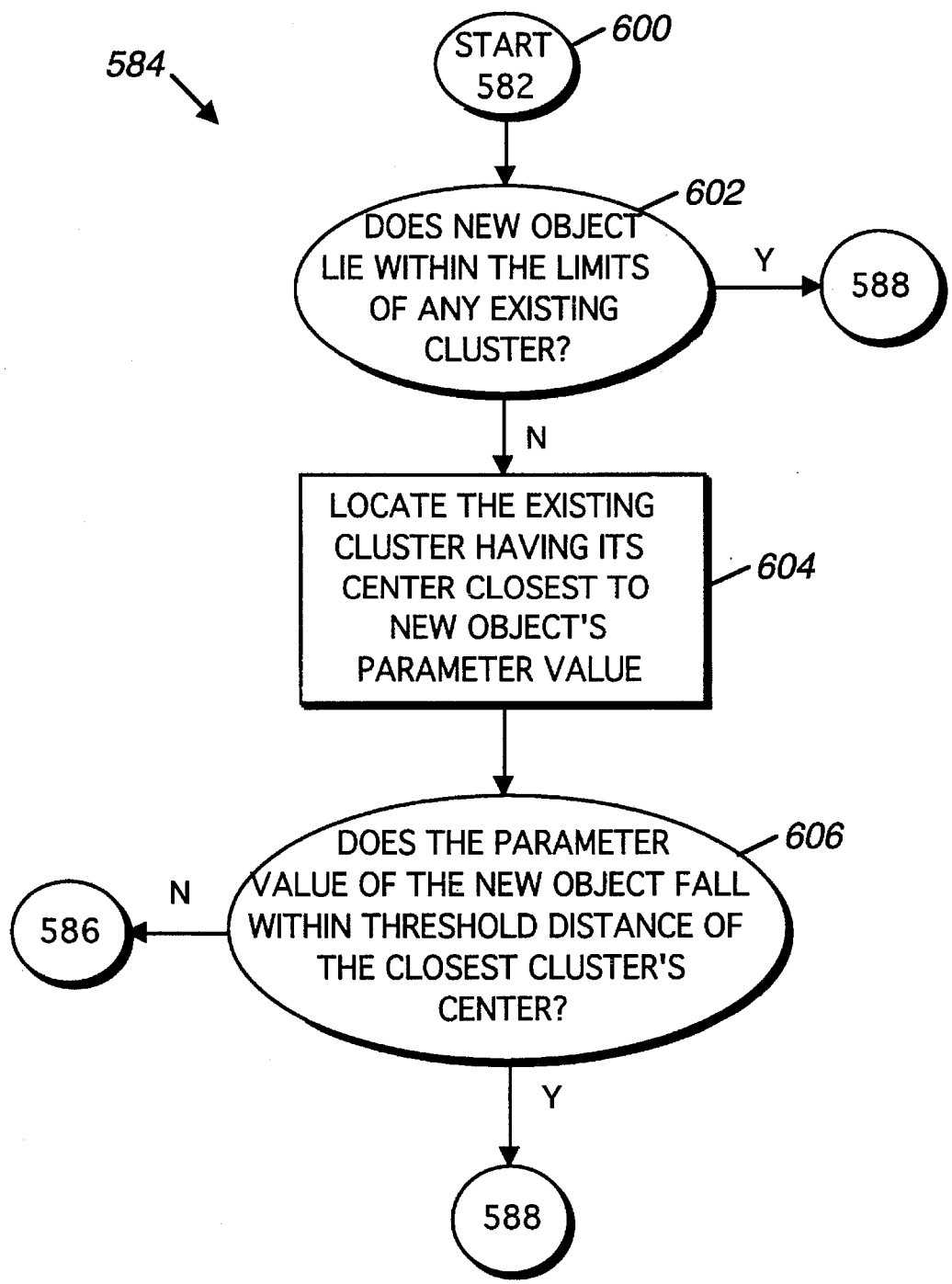
Figure 23C:
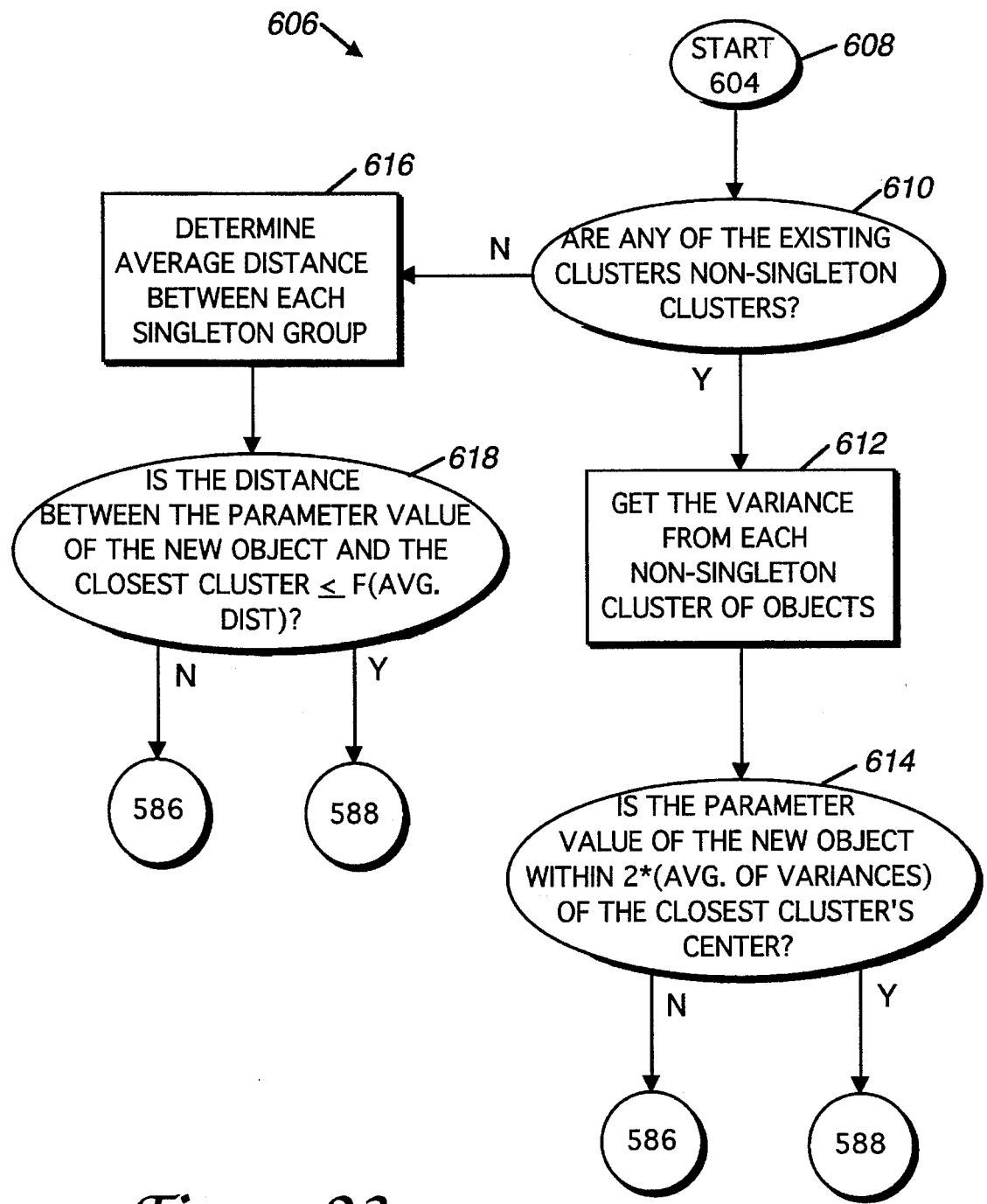

The process of determining whether a parameter value of the new object is sufficiently close to the corresponding parameter value of an existing cluster to merit grouping of the new object with the cluster (decision step 584 of FIG. 23A) is detailed in FIG. 23B. The process begins at 600 and proceeds to a decision step 602 which determines whether the new object falls within the limits of any existing cluster. These "limits" are defined by the outer most values of the parameter under consideration within the existing cluster. For example, a cluster may contain 10 objects each having an x value near 50. However within this cluster, the object with the lowest x value has a value of 43 and the object having the highest x value has a value of 54. The limits of this cluster are x values of 43 and 54. If the new object has an x value of 52, it will fall within the cluster. If decision step 602 determines that the new object does indeed fall within the limits of any existing cluster, the process is concluded at step 588 of FIG. 23A (i.e., the new object is added to the existing cluster). If, however, decision step 602 determines that the new object does not fall within the limits of any existing cluster, a step 604 locates the existing cluster having a center that is closest to the parameter value of the new object. Thereafter a decision step 606 determines whether the parameter value of the new object falls within a "threshold distance" of the center of the closest cluster identified in the step 604. In some preferred embodiments, the values of the parameter and/or the cluster center are provided as a range of values rather than a distinct point. In such embodiments, the threshold distance is defined between the near edges of the range of values. If the answer in decision step 606 is yes, the process is concluded at step 588 of FIG. 23A as described above. If, however, the answer is no, the process is concluded at step 586 of FIG. 23A (a new cluster is created for the new object). The details associated with determining the (threshold distance) identified in decision step 606 are detailed in FIG. 23C.

The process of 23C starts at 608 and proceeds to decision step 610 which determines whether any of the existing clusters (regardless of whether they are near the new object) are non-singletons. A non-singleton is a cluster containing more than a single object. If decision step 610 is answered in the affirmative, a step 612 determines the variances for each non-singleton cluster of objects. The variance, as used herein, is a statistical measure of the average deviation of the members of a cluster from their center. After step 612 is completed a decision step 614 determines whether the parameter value of the new object is less than or equal to 2 times the average of the variance in distance from the center of the closest cluster. This multiplier (2) ensures that the cluster width includes a large majority of elements in a normal distribution (which often describes the clusters). If step 614 is answered in the affirmative, the process is concluded at step 588 of FIG. 23A (the object is added to the closest existing cluster). If, on the other hand, decision step 614 is answered in the negative, the process is concluded at step 586 of FIG. 23A (a new cluster is created for the new object).

If decision step 610 determines that none of the existing clusters are non-singletons, a step 616 determines the average distance between each two adjacent singleton clusters. A decision step 618 then determines whether the parameter value of the new object is within some function of that average distance of the center of the closest cluster. It has been found that one-fifth of the average distance calculated in step 616 serves as a good measure for use in decision step 618. Thus, if the distance between the parameter value of the new object and the closest other object is less than or equal to one-fifth of the average distance between the objects, the new object will be added to the closest object's cluster. At this point, that cluster will include two members, the new object and the close existing object. If decision step 618 is answered in the affirmative, the process is concluded at step 588 of FIG. 23A as described above. If, on the other hand, decisions step 618 is answered in the negative, the process is concluded at step 586 of FIG. 23A as described above.

In preferred embodiments, the parameter value of the new object is a range of values rather than a single value. As noted above in connection with step 606, ranges of values may be used in determining whether a new object's parameter value falls within a threshold distance of a nearby cluster's center. The width of a range may vary depending upon which test is applied. For example, when the new object parameter value is compared against that of a cluster that contains only a single object, the range of values associated with parameter value of the new object preferably is less than the range employed in other comparisons (i.e. decision steps 602 and 614).

Figure 23D:
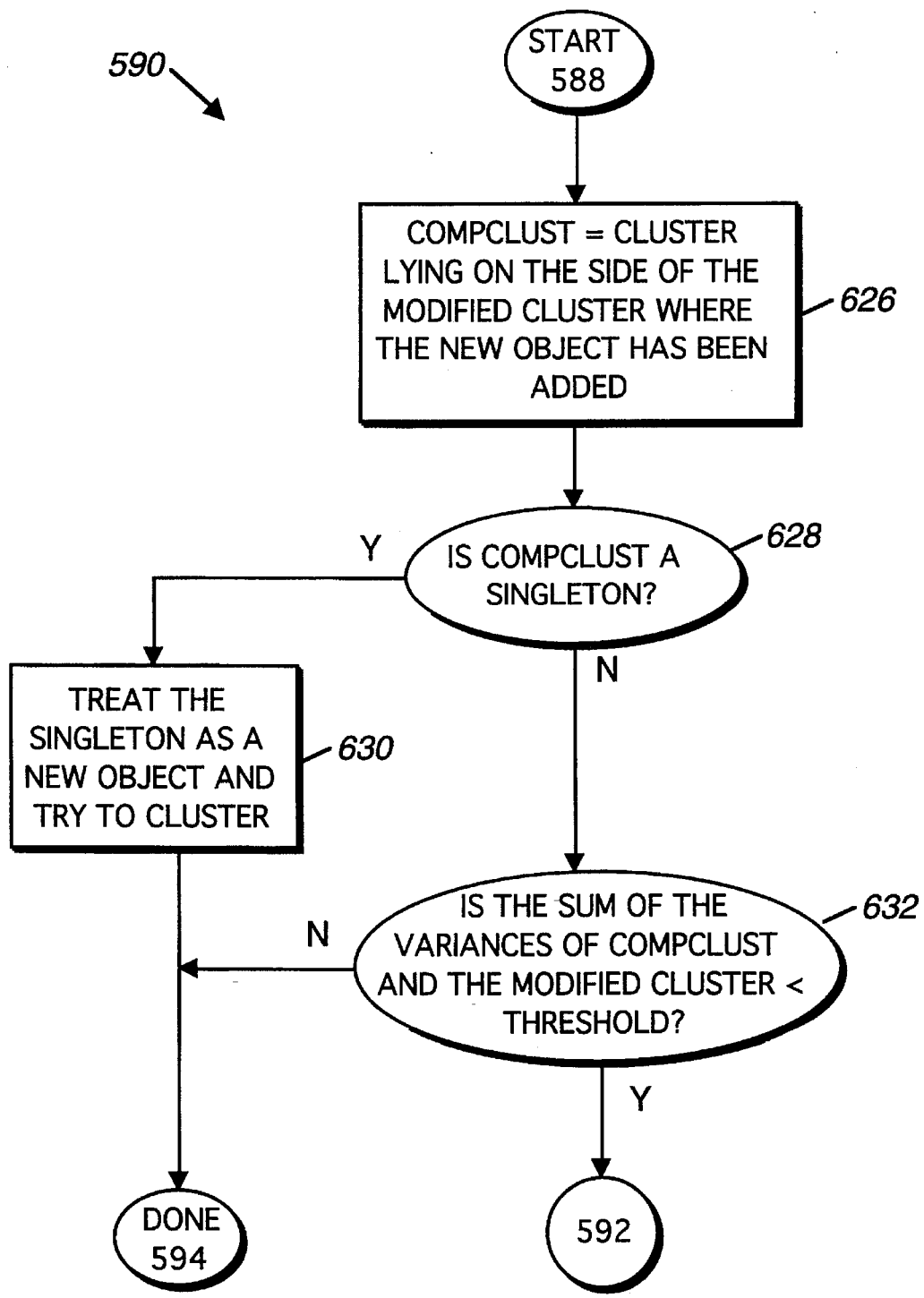

FIG. 23D details the procedure by which decision step 590 of FIG. 23A determines whether an existing cluster should be merged with another cluster. The process begins at 624 and proceeds to a step 626 which defines a "comparison cluster" as that cluster lying on the side of the "modified" existing cluster at which the new object has been added. The "modified cluster" is that cluster to which the new object has been added in step 588 of FIG. 23A. The new object will lie on one side or the other of the center of the modified cluster. The comparison cluster lies on the side of the modified cluster containing the new object. After the comparison cluster has identified in step 626, a decision step 628 determines whether the comparison cluster is a singleton. If it is not, a decision step 632 determines whether the sum of the variances of the comparison cluster and the modified cluster are less than a predetermined "threshold."

This "threshold" will be some function of the distance between the centers of the modified and comparison clusters (in preferred embodiments, the threshold will be about 0.4 times the distance between the centers). If decision step 632 is answered in the affirmative, the process is concluded at step 592 of FIG. 23A (the two clusters are merged). If, however, the answer to decision step 632 is negative, the process is concluded at 594 of 23A (i.e. the process is concluded without merging the clusters). If decision step 628 determines that the comparison cluster is in fact a singleton, a step 630 treats that singleton as a new object for purposes of determining whether it should be merged with the modified cluster. In other words, the object in the comparison cluster is evaluated according to steps 612 and 614 of FIG. 23C. Ultimately, this will determine whether the comparison cluster should be added (merged) to the modified (existing cluster) or should remain as an independent cluster.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A pointer-based computer system capable of aligning geometric figures in clusters, the system comprising:

a display screen sensitive to the location of a pointer;

a stroke grouper receptive to a plurality of strokes formed on the display screen by the pointer and operative to group the plurality of strokes into a stroke group;

a shape recognition engine receptive to the stroke group and capable of recognizing said stroke group as a geometric figure taken form the classes of at least one of circles and squares;

means for determining the value of an alignment parameter for a new geometric figure provided to the display screen;

means for determining, for a cluster of geometric figures on said display screen, a fixed value for the alignment parameter, a mean value of the alignment parameter, and a variance from the mean value for geometric figures making up the cluster;

means for determining whether the alignment parameter of the new geometric figure added to the display screen is within a defined threshold distance of the cluster's mean value;

means for aligning the new geometric figure with the cluster on the display screen such that the new geometric figure is aligned with the fixed value of the cluster; and means for redefining the cluster's mean value and variance from the mean for new geometric figures making up the cluster to account for the addition of the new shape to the cluster.

2. The pointer-based computer system of claim 1 wherein the pointer is a stylus.

3. The pointer-based computer system of claim 1 wherein the means for determining the value of the alignment parameter determines, for the new geometric figure, the value of a parameter selected from the group consisting of coordinates and sizes of the new geometric figure.

4. The pointer-based computer system of claim 1 wherein the means for determining, for a cluster of geometric figures on said display screen, a fixed value for the alignment parameter, a mean value of the alignment parameter, and a variance from the mean value for geometric figures making up the cluster sets the fixed value of the cluster's alignment parameter equal to the alignment parameter of the first shape added to the cluster.

5. The pointer-based computer system of claim 1 wherein the means for determining the value of the alignment parameter of the new geometric figure determines the value of the alignment parameter for circles and squares added to the screen.

6. The pointer-based computer system of claim 1 wherein the means for aligning the new geometric figure with the cluster displays the new geometric figure as if the value of its alignment parameter was equal to the fixed value for the cluster.

7. The pointer-based computer system of claim 1 wherein the means for determining whether the alignment parameter of the new geometric figure added to the display screen is within a defined threshold distance determines whether the new figure's alignment parameter lies within a range of alignment parameters of the shapes constituting the cluster.

8. A pointer-based computer system capable of aligning geometric figures in clusters, the system comprising:

a display screen sensitive to the location of a pointer;

a shape recognition engine receptive to a stroke group formed on the display screen by the pointer, the shape recognition engine also being capable of recognizing said stroke group as a geometric figure taken from the classes of at least one of circles and squares;

means for determining the value of an alignment parameter for a new geometric figure provided to the display screen;

means for determining whether the alignment parameter of the new geometric figure is within a defined threshold distance of a corresponding alignment parameter for another geometric figure or a cluster of geometric figures on said display screen; and means for aligning the new geometric figure with the other geometric figure or cluster on the display screen.

9. The pointer-based computer system of claim 8 further comprising means for determining, for a cluster of geometric figures on said display screen, a fixed value for the alignment parameter, a mean value of the alignment parameter, and a variance from the mean value for geometric figures making up the cluster.

10. The pointer-based computer system of claim 8 wherein the pointer is a stylus.

11. The pointer-based computer system of claim 8 wherein the means for determining the value of the alignment parameter for the new geometric figure determines, for the new geometric figure, the value of a parameter selected from the group consisting of coordinates and sizes of the new geometric figure.

12. The pointer-based computer system of claim 8 wherein the means for determining the value of the alignment parameter for the new geometric figure determines the value of the alignment parameter for circles and squares added to the screen.

13. The pointer-based computer system of claim 8 wherein the means for determining whether the alignment parameter of the new geometric figure added to the display screen is within a defined threshold distance determines whether the new figure's alignment parameter lies within a range of alignment parameters of the other geometric figure or the geometric figures constituting the cluster.

* * * * *